United States Patent
Whinnery et al.

(10) Patent No.: US 6,794,837 B1
(45) Date of Patent: Sep. 21, 2004

(54) MOTOR SPEED-BASED ANTI-PINCH CONTROL APPARATUS AND METHOD WITH START-UP TRANSIENT DETECTION AND COMPENSATION

(75) Inventors: Joseph P. Whinnery, Auburn Hills, MI (US); Jon C. Everhart, Jr., Rochester Hills, MI (US); Thierry Caussat, West Bloomfield, MI (US); David M. Wenrick, Waterford, MI (US)

(73) Assignee: Valeo Electrical Systems, Inc., Auburn Hills, MI (US)

(*) Notice: Subject to any disclaimer, the term of this patent is extended or adjusted under 35 U.S.C. 154(b) by 58 days.

(21) Appl. No.: 10/159,171

(22) Filed: May 31, 2002

(51) Int. Cl.[7] .............................. H02P 3/20; H02P 5/00; E05F 15/10
(52) U.S. Cl. ....................... 318/282; 318/266; 318/286; 318/54; 318/65; 49/28
(58) Field of Search ............................... 318/282, 265, 318/266, 468, 286, 54, 65; 49/28, 26

(56) References Cited

U.S. PATENT DOCUMENTS

| | | | |
|---|---|---|---|
| 4,347,465 A | | 8/1982 | Goertler et al. |
| 4,514,670 A | * | 4/1985 | Fassel et al. ................. 318/467 |
| 4,641,067 A | | 2/1987 | Iizawa et al. |
| 4,686,598 A | | 8/1987 | Herr |
| 4,709,196 A | | 11/1987 | Mizuta |
| 4,870,333 A | * | 9/1989 | Itoh et al. .................... 318/286 |
| 4,900,994 A | | 2/1990 | Mizuta |
| 5,012,168 A | | 4/1991 | Dara et al. |
| 5,069,000 A | | 12/1991 | Zuckerman |
| 5,218,282 A | | 6/1993 | Duhame |
| 5,278,480 A | | 1/1994 | Murray |
| 5,334,876 A | | 8/1994 | Washeleski et al. |
| 5,410,226 A | | 4/1995 | Sekiguchi et al. |
| 5,497,326 A | | 3/1996 | Berland et al. |
| 5,530,329 A | | 6/1996 | Shigematsu et al. |
| 5,585,702 A | | 12/1996 | Jackson et al. |
| 5,610,484 A | | 3/1997 | Georgin |
| 5,616,997 A | | 4/1997 | Jackson et al. |
| 5,714,853 A | | 2/1998 | Knab et al. |
| 5,734,244 A | | 3/1998 | Lill et al. |
| 5,734,245 A | | 3/1998 | Terashima et al. |
| 5,773,947 A | | 6/1998 | Torii et al. |
| 5,780,988 A | | 7/1998 | Kalb et al. |
| 5,801,501 A | | 9/1998 | Redelberger |
| 5,834,658 A | | 11/1998 | Pruessel |
| 5,877,569 A | | 3/1999 | Heinrich et al. |
| 5,917,296 A | | 6/1999 | Frey et al. |
| 5,950,365 A | | 9/1999 | Lieb et al. |
| 5,952,801 A | | 9/1999 | Boisvert et al. |
| 5,963,001 A | | 10/1999 | Peter et al. |
| 5,977,732 A | | 11/1999 | Matsumoto ................. 318/283 |
| 5,977,735 A | | 11/1999 | Aab |

(List continued on next page.)

FOREIGN PATENT DOCUMENTS

| | | |
|---|---|---|
| DE | 42 14 998 | 11/1993 |
| DE | 43 44 378 | 6/1994 |

*Primary Examiner*—David Martin
*Assistant Examiner*—Edgardo San Martin
(74) *Attorney, Agent, or Firm*—J. Gordon Lewis

(57) ABSTRACT

A control apparatus and method for a panel movable between at least two positions by an electric motor having a rotatable armature. The control generates time periods for the rotation of the armature over a constant angular distance. An average time period is computed over a predetermined number of time periods and compared with a threshold time period to determine if an obstacle is present in the path of movement of the closure. Transient counts are accumulated for increasing average time periods over a number of time period samples to detect an obstacle. A compensation factor is used to adjust a threshold upon detecting a start-up transient during an initial movement of the motor armature coupled to the panel to delay activation of obstacle detection until the start-up transient diminishes.

6 Claims, 34 Drawing Sheets

U.S. PATENT DOCUMENTS

| | | |
|---|---|---|
| 5,983,567 A | 11/1999 | Mitsuda |
| 6,008,607 A | 12/1999 | Haderer |
| 6,064,165 A | 5/2000 | Boisvert et al. |
| 6,070,116 A | 5/2000 | Pruessel et al. |
| 6,086,177 A | 7/2000 | Driendl et al. |
| 6,125,583 A | 10/2000 | Murray et al. |
| 6,172,473 B1 | 1/2001 | Oka et al. |
| 6,183,040 B1 | 2/2001 | Imaizumi et al. |
| 6,194,855 B1 | 2/2001 | Lochmahr et al. |
| 6,208,101 B1 | 3/2001 | Seeberger et al. |
| 6,222,362 B1 | 4/2001 | Schulter et al. |
| 6,236,176 B1 | 5/2001 | Uebelein et al. |
| 6,274,947 B1 | 8/2001 | Terashima |
| 6,297,609 B1 | 10/2001 | Takahashi et al. |
| 6,308,461 B1 | 10/2001 | Hopson et al. |
| 6,329,779 B1 * | 12/2001 | Pimley et al. .............. 318/445 |
| 2003/0189415 A1 * | 10/2003 | Fitzgibbon .................. 318/466 |

* cited by examiner

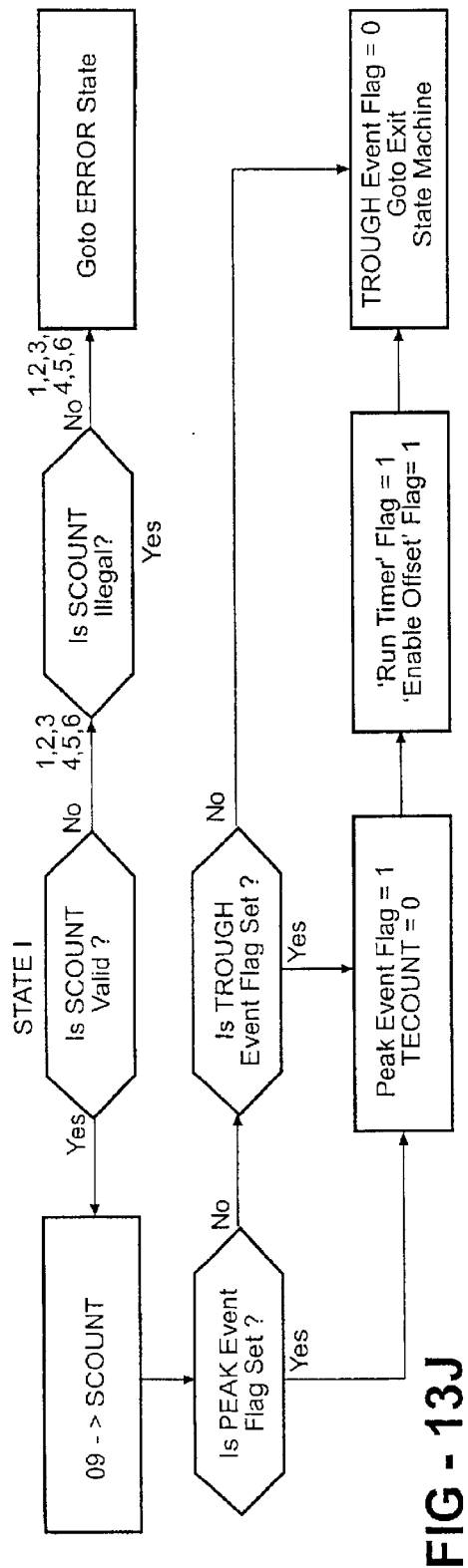
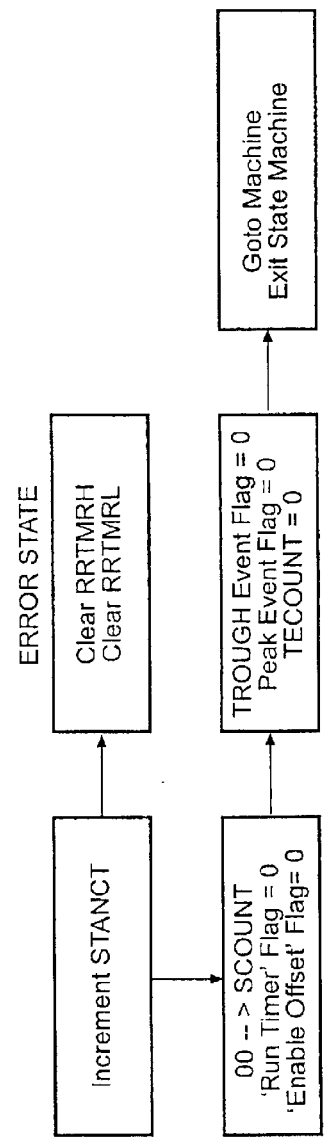
FIG - 13J
FIG - 13K

MOTOR SPEED-BASED ANTI-PINCH CONTROL APPARATUS AND METHOD WITH START-UP TRANSIENT DETECTION AND COMPENSATION

BACKGROUND

The present invention relates, in general, to control apparatus for motor driven closures which having obstacle detection capabilities, and more particularly, to motor controls with obstacle detection capabilities for moveable closures used in vehicles.

Electric motor drives for windows, sliding roofs and van doors are commonly employed in motor vehicles to automatically move the closure panel or door between open and closed positions. However, an automated closing system can be dangerous if it cannot accurately detect an obstruction in its path of travel.

Government regulations specify that any automatic closure system must be equipped with an anti-pinch safety feature which meets FMVSS118. Because of the safety concerns with these types of obstacle detection systems, sometimes what is intended to be a convenience item on a vehicle becomes an annoyance feature. This is because every obstacle detection design has to strike a balance between being too sensitive or not being sensitive enough. If an obstacle detection design is too sensitive, slight variations in the load on the motor can cause the system to erroneously detect an obstacle and reverse the motor rotation thereby moving the closure panel back to the open position. This is often referred to as a "false reversal." False reversals are an annoyance because the automatic closure system did not close when the operator of the vehicle initiated a closed command, thus requiring the operator to reinitiate the closed command. If an obstacle detection design is not sensitive enough, then the force on a pinched object, i.e., an arm or hand, etc., may exceed the government regulated force limit of 100 Newtons.

There are two basic implementation strategies for anti-pinch obstacle detection systems. The first approach uses sensors that monitor the closure path. Sensors in the seal around a vehicle window, or an infrared light curtain are the most common approaches. However, this approach is usually very costly to implement.

The second approach is a motor-based system. This type of system detects obstructions in the closure path by sensing changes in the load on the motor. Most motor-based obstacle detection systems in use today fall into two categories. One type uses a current shunt to measure the current through the motor. The other approach uses a ring magnet on the motor armature together with a Hall effect sensor to produce a digital pulse train that corresponds to the period of rotation the armature. These two methods are respectively referred to as current-sensing and speed-sensing approaches.

However, many of the obstacle detection systems are "history based" meaning that such systems keep track through memory storage of previous data points, i.e., motor speed, motor current, etc., and compare the current run or motor operation cycle to past data to determine if changes have occurred which could be obstacles. However, such "history based" systems require considerable processing time and therefore are slower in response to a detected obstacle. Such systems also require a large memory to store the historical data points.

Examples of environmental conditions that may affect or cause variations in motor speed include the applied voltage, the ambient temperature, joints or weld points in the track of the closure assembly, such as the seal and channel that a side door window travels in, accelerations of the assembly in the X, Y or Z axes, etc. For an automotive product, environmental conditions may also include battery voltage when the car engine is off versus alternator voltage when the engine is running. Cold weather, on the other hand, causes the rubber seals around the window to become stiff and create more drag on the glass during movement of the glass and when the glass enters the upper seals at the closed position.

If a vehicle hits a pothole or speed bump, the window glass experiences acceleration in the Z axis. This acceleration of the mass of the window glass causes a reaction force at the motor armature which, in turn, causes a variation in the speed of the motor.

Any one of these conditions can cause a significant deceleration of the motor armature, thus causing a control algorithm to detect an obstacle and reverse the direction of movement of the window glass when no obstacle is actually present in the closure path of the window.

Existing obstacle detection systems state that they can detect the presence of rough road. However, it appears that such detection is at the expense of maintaining a sensitive pinch force level. For example, if a windowlift anti-pinch system has a typical pinch force of 80 Newtons, during rough road the allowable pinch force level is raised to 150–180 Newtons. While this method does limit the possibility of a false reversal, it does not maintain an acceptable limit on the pinch force. Further, these pinch forces may not meet government set levels.

Thus, it would be desirable to provide an obstacle detection system for a moveable closure which addresses the deficiencies in previously devised obstacle detection systems. It would also be desirable to provide an obstacle detection system which has a quicker response time, and smaller memory requirements than previously devised obstacle detection systems. It would also be desirable to provide an obstacle detection system which includes compensation for start-up transients.

SUMMARY

The present invention is a power panel apparatus having a unique, robust obstacle detection control to reverse the direction of movement of the panel when an obstacle is detected in the path of movement while preventing false reversals due to environmental induced faults, such as startup transient, rough road, end of zone seal entry, voltage and temperature variations, movement bind positions, and multi-zone time or position-based step functions.

In one aspect, the inventive powered movable panel control apparatus is used with a panel movable between first and second positions, an electric motor having an armature for driving the panel between the first and second positions, means for detecting deceleration of a motor armature. The control includes timer means, responsive to the detecting means, for generating consecutive time periods between a predetermined amount of rotation of the armature.

The present invention also defines a method of controlling a power panel including the steps of:

determining deceleration of the motor armature;

classifying a degree of relative deceleration with respect to a threshold defining a potential obstacle in the path of movement of a panel driven by the motor;

assigning a weighted value to the relative deceleration of the motor armature;

accumulating successive weighted values as a total cumulative weight value;

comparing the total cumulative weighted value with a total cumulative weight defining an obstacle in the path of movement of the panel; and reversing the direction of movement panel when the total cumulative weighted value equals or exceeds a total cumulative weight defining an obstacle present.

The present power panel apparatus and method provides a robust control for detecting an obstacle in the path of movement of a panel while preventing false reversals due to any one or more of a number of factors including one or more of startup transient, rough road, end of zone seal entry, voltage and temperature variations, and movement bind positions.

BRIEF DESCRIPTION OF THE DRAWING

The various features, advantages and other uses of the present invention have become more apparent by referring to the following detailed description and drawings in which:

FIGS. 13A–13L are flow diagrams depicting the control sequence for rough road compensation;

DETAILED DESCRIPTION

Figure 1:
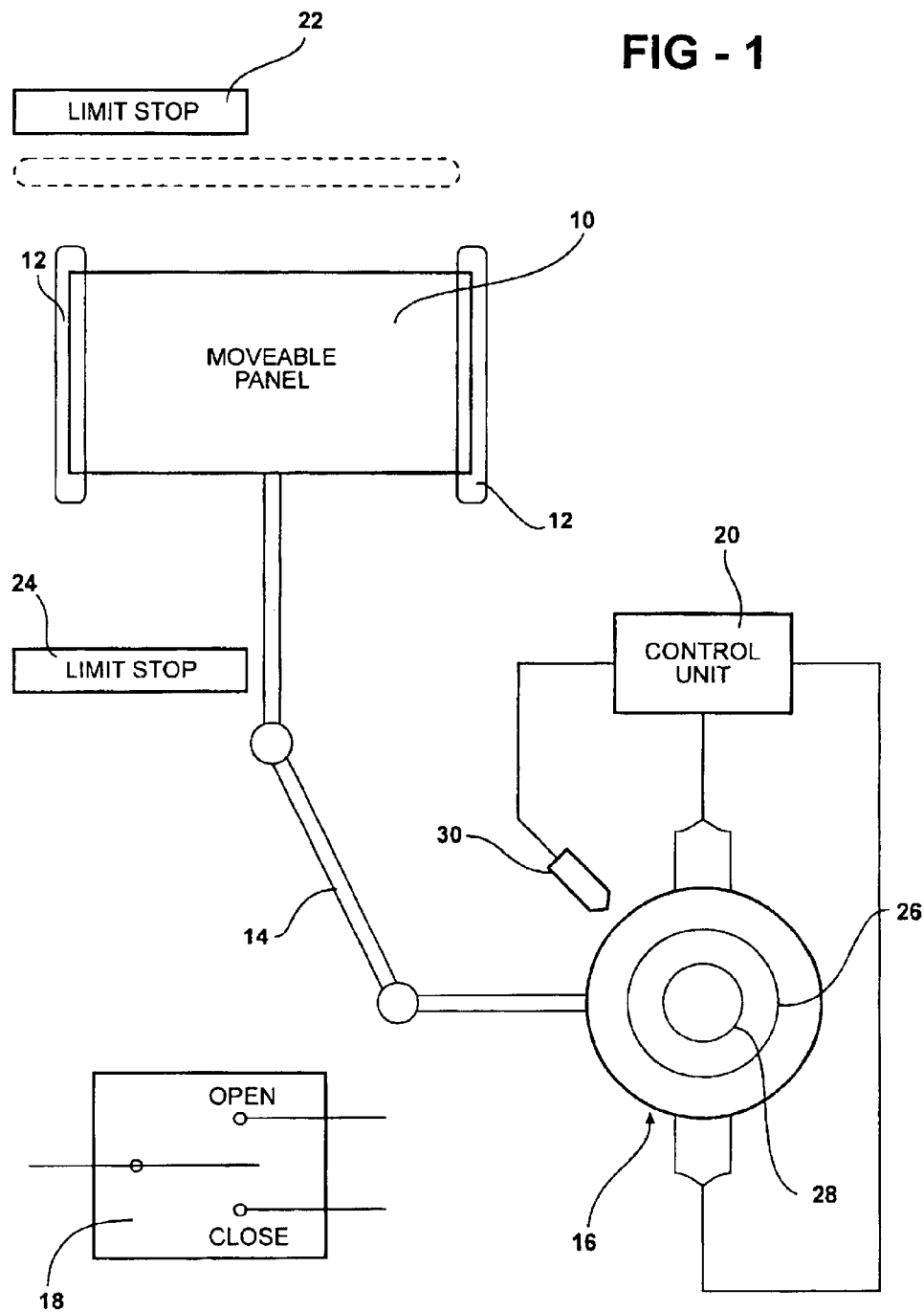
FIG. 1 is a pictorial representation and block diagram of a vehicle panel control system having an obstacle detection capability according to the present invention.

Referring now to the drawing, and to FIG. 1 in particular, there is depicted an exemplary moveable panel system utilizing an obstacle detection apparatus according to the present invention.

It will be understood that the following obstacle detection control apparatus according to the present invention, although described in conjunction with a moveable panel or panel, such as a vehicle window glass, will also apply to any movable panel or partition, such as vehicle sliding doors, pivoting and sliding sunroofs, pivotal vehicle rear lift gates, sliding vehicle running boards, tonneau covers, garage door openers, etc.

Thus, as shown in FIG. 1, by example only, a panel 10, such as a moveable window glass in a motor vehicle, is slidably mounted in a pair of opposed channels 12 which form part of a vehicle door frame. A linkage 14 pictorially represented in FIG. 1 is coupled to the panel 10 and is operated by connection to an output shaft of a motor 16, preferably a bi-directional electric motor. The linkage 14 may take any form, typical of moving panel linkages or drive systems found in vehicles.

A power source, such as a vehicle battery, not shown, is connected to the electrical components of the panel drive system, including the motor 16, an open and close switch 18, and a control means or unit 20. The open and close switch 18 is typical of a switch found in a motor vehicle for movement between open and close positions from a center neutral position. The switch 18 is connected to the vehicle battery or power source and provides separate output signals, i.e., an open input signal or a closed input signal, upon actuation by a vehicle passenger.

Limit stops 22 and 24, which may constitute hard stops or structural members mounted in the vehicle door, define upper and lower stop positions, respectively, of the panel 10. The limit stops 22 and 24 cause the motor 16 to stall which can be detected by the control means 20 to deactivate further operation of the motor 16.

The motor 16 has an armature 28. Means are provided for measuring and detecting changes in the velocity of rotation of the armature 28. A variety of different means or sensors can be employed to measure the velocity of the armature 28. For example, optical encoders or resistive sense means (where a resistance changes with angular position of the armature) may be employed. With each of these types of velocity sensing means, the period of rotation of the armature 28 is divided into at least one and preferably a plurality of equal angular rotation periods through which the armature 28 rotates a set number of degrees.

Another armature 28 velocity determining means may utilize a ring magnet 26 mounted on the armature 28. The ring magnet 26 may be provided with at least one and preferably a plurality of poles depending upon the degree of resolution desired for the obstacle detection system. A sixteen pole ring magnet 26 will be described hereafter by way of example only. It will be understood that ring magnets 26 having other numbers of poles, such as 2, 4, 8, 32, etc., may also be employed in the obstacle detection system described hereafter.

A detector 30, such as a Hall sensor, is mounted in a position to detect passage of the poles of the ring magnet 26 therepast. The sensor 30 outputs a pulse train 32, shown in FIG. 2, of a generally squarewave configuration having successive rise and fall edges 34 and 36 surrounding a high level signal 38 and a low level signal 40. Each rising and falling edge transition 34 and 36 from low to high or high to low level signals is output to the control unit 20.

The control unit 20 may be a stand alone control circuit dedicated to the operation of a panel control system. In one aspect of the invention, the control unit 20 is a central processor based unit operating a control program stored in an associated memory. As is typical in motor vehicles, the control unit 20 may be embodied in a motor control unit or a body controller already existing in the vehicle for controlling other vehicle components.

Figure 2:
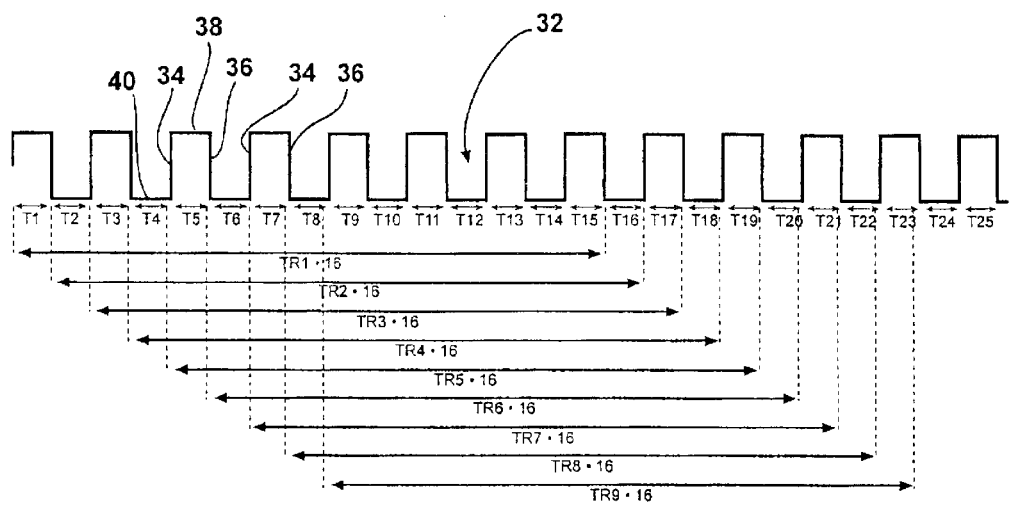
FIG. 2 is a timing chart used in the present apparatus.

As shown in FIG. 2, the time period between successive edge transitions 34, 36, 34, etc., denotes the time period between the passage of each pole of the ring magnet 26 past the sensor 30. This time period is directly related to the speed of rotation of the motor armature 28. The time periods between successive edge transitions 34, 36, 34, 36, etc., are indicated as T1, T2, etc. Any variation in the speed of rotation of the motor armature 26 caused by a stall condition when the panel 10 reaches one of the limit stops 22 or 24, or if the panel 10 strikes an obstacle in the path of movement of the panel 10 or due to one of the aforementioned external conditions, will cause a change or variation in the motor armature 28 speed. This speed variation results in a corresponding variation in one of the time periods T1, T2, etc., either increasing or decreasing the time period.

The control unit 20 operates on an interrupt basis to detect each edge transition 34, 36, etc., calculates the time periods T1, T2, etc., and then determines an average of the time periods to detect significant variations in order to determine whether the sensed variation in motor speed is a result of an external condition or an actual obstacle in the path of movement of the panel 10.

As described hereafter, the control unit 20 receives the pulse sequence or pulse train 32 shown in FIG. 2 from the sensor 30. By means of an internal clock, control unit 20 measures the time period for each edge transition 34, 36, etc., to generate a precise measurement of the speed of rotation of the motor armature 28.

The control unit 20 records or stores in its associated memory the time period between each transition, T1, T2, T3, ... T16, etc. For each successive sixteen time periods, the control unit then calculates an average time period TR1. This average period is a measure of speed of rotation of the motor armature 28 for one complete 360° revolution of the motor armature 28. The control unit 20 calculates a new average period TRn for each new transition of the pulse sequence 32 as follows:

$TR1=(T1+T2+T3+T4+T5+T6+T7+T8+T9+T10+T11+T12+T13+T14+T15+T16)/16$ $TR2=(T2+T3+T4+T5+T6+T7+T8+T9+T10+T11+T12+T13+T14+T15+T16+T17)/16$ $TR3=(T3+T4+T5+T6+T7+T8+T9+T10+T11+T12+T13+T14+T15+T16+T17+T18)/16$ $TR9=(T9+T10+T11+T12+T13+T14+T15+T16+T17+T18+T19+T20+T21+T22+T23+T24)/16$

At a predetermined point in the rotation of the motor armature 28, such as for every half revolution, quarter revolution, full revolution, etc., with a half revolution being described hereafter by way of example only, the control unit 20 calculates the relative acceleration of the motor armature 28 hereafter referred to as TDIFFn. Thus, TDIFF(9)=TR9−TR1.

If an object obstructs the path of movement of the panel 10 moving in a closing direction between the limit stops 22 and 24, the object will cause the speed of the motor armature 28 to decrease. This decrease in the speed of the motor armature 28 will cause the time between edge transitions 34, 36, etc., in the pulse sequence 32 to become longer, thus increasing the average period TRn. When TRn becomes larger, then TR(n)−TR (n−8) becomes larger. Thus, it is clear that an object obstructing the path of movement of the panel 10 when moving in a closing direction will cause TDIFF(n) to become a large positive number.

The panel anti-pinch function has to determine whether or not an obstacle is present. This is determined by two failure modes:

1. force loads on the objector obstruction exceed 100N with an obstacle present, and
2. detection of an obstacle without an obstacle being present.

In order to avoid the second failure mode, the control system must take into account all disruptions in the system during a threshold calculation phase to calculate a total offset or acceptable noise level. All current TDIFF values are compared with the total offset to evaluate whether or not an obstacle is present and by indicating the probability of an obstacle being present. A post threshold calculation phase consists of making a final decision whether or not an obstacle is present.

First, the anti-pinch function utilizes a default value. Additional compensations or offsets are provided as a voltage offset, a temperature offset, a bind offset, startup transient ramp, end of zone ramp, rough road, or time based step offset and position based step offset. These offsets and all compensations are totaled to generate a total offset number 50. The total offset 50 divided by four equals a "bandwidth".

Figure 3:
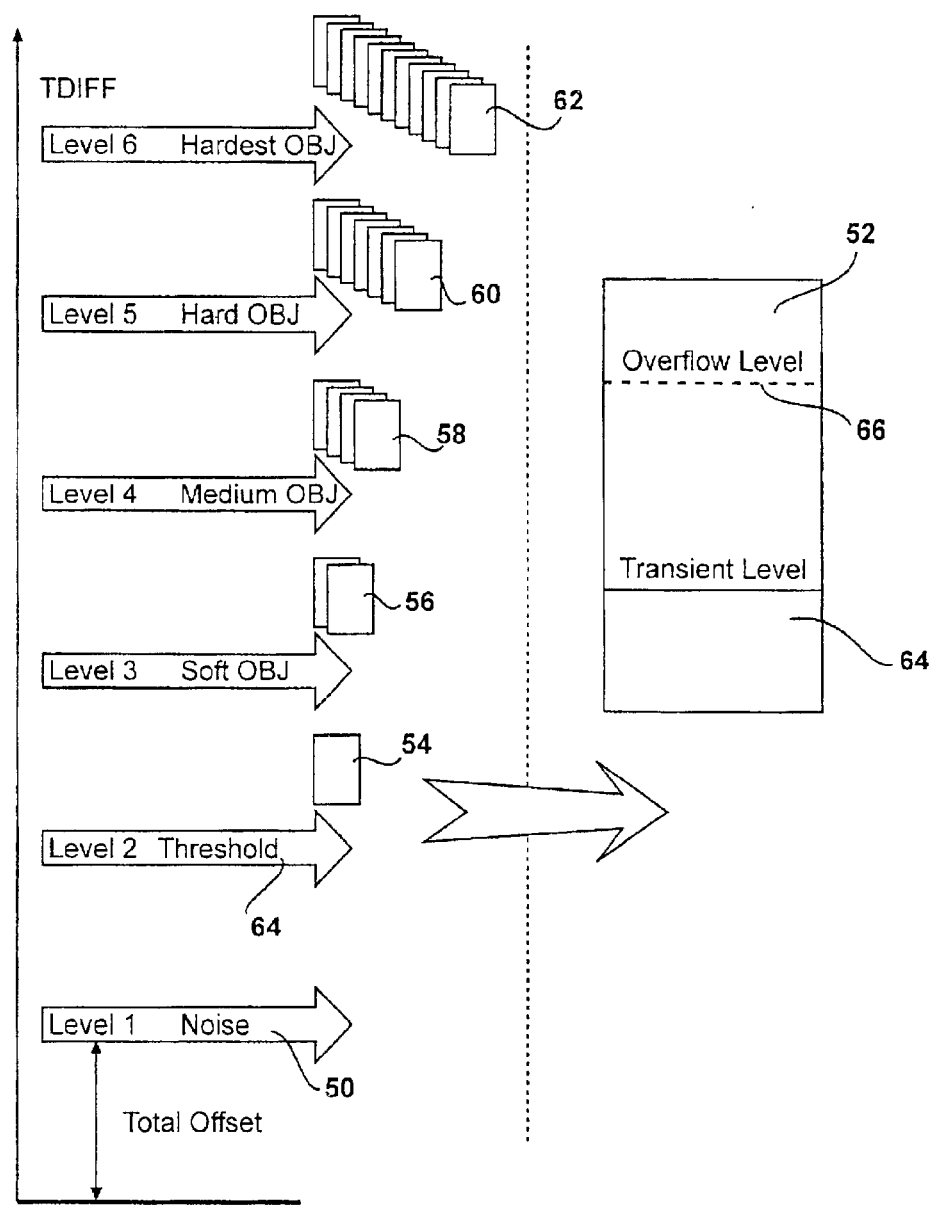
FIG. 3 is a pictorial representation of the noise and object detection threshold routine.

As shown in FIG. 3, the total offset 50 establishes level one. A plurality of spaced levels, each separated by one bandwidth as calculated above are then established as levels two through level six, for example, only. Each level corresponds to a different stiffness level such as a threshold stiffness at level two, a soft object stiffness at level three, a medium object stiffness at level four, a hard object detection stiffness at level five and a hardest object detection stiffness at level six. A transient counter 52 is employed in the processor. Transient counts of varying magnitude, such as transient counts 54, 56, 58, 60 and 62 are provided for TDIFF values falling between any two levels. For example, a minimum threshold is established as level two. If T diff is between levels two and three, the transient counter 52 is incremented by a transient count 54 of one. If TDIFF has a magnitude between level three and four, the transient counter 52 is incremented by a transient count 56 equal to two. A TDIFF magnitude between levels four and five is assigned a transient count 58 of four. A TDIFF value between levels five and six is assigned a transient count 60. Finally, a TDIFF value greater than level six is assigned a transient count 62 of eleven. The transient counter 52 is an accumulative counter for each new transient count generated with any TDIFF signal.

However, certain rules are applied to the transient counter 52 which control its function or output. If a T diff value below level one 50 is measured for three consecutive TDIFF signals, the transient counter 52 is reset to zero. If the transient count is different from zero between two consecutive TDIFF signals, then the transient count associated with the magnitude of the TDIFF signal with reference to levels two through six is added to the count accumulated in the transient counter 52. When the count value of the transient counter 52 exceeds an overflow number 66 equal to a transient count of twelve, for example, the control or processor 20 provides an output signal indicative of an obstacle present or detected, which signal defines a panel reverse movement signal.

The TDIFF signals are rounded off so as to be quantified as an absolute value. The bandwidth between successive levels in terms of TDIFF signal magnitude is determined by the equation:

$$level_{x+1} = level_x + level_{x/4}.$$

The bandwidth, which is rounded off as an absolute values, maybe constant between each level 1–6 or may vary, such as in increasing bandwidth magnitudes as the level number increases indicating a greater stiffness object being potentially detected in the path of movement of the panel.

In the threshold calculation stage, the offset level 50 and the transient level 64 is calculated by using the compensations as described above. These compensations include bind, voltage, temperature, startup transient, endzone ramp and rough road compensations. These will be discussed in the listed order given.

Mechanical Bind

Figure 4:
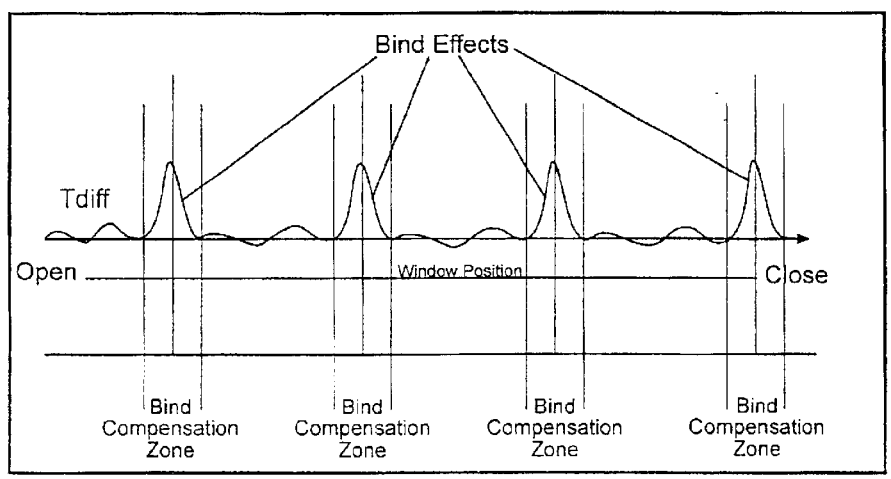
FIG. 4 is a graph depicting bind compensation zones.

As shown in FIG. 4, bind compensation zones exist in at least in one and usually in a plurality of angular positions due to wearing down of the motor drive gear teeth. The binds cause a periodic disturbance or increase in TDIFF as might be noted regularly during panel travel. Typically, there may be up to four or five disturbances in T diff during the complete panel travel between first and second or open and closed positions. To compensate for these bind zones, the control 20 needs to know the ratio of the motor gear in order to calculate the position of the appropriate zones knowing the full closed or second position of the panel. The bind compensation or offset threshold can be calculated empirically.

Voltage Compensation

Voltage level has an influence on motor speed and must be compensated at voltages other than a nominal voltage, such as sixteen volts at room temperature.

The following chart shows changes in TDIFF values for different system voltage levels.

| Temperature | Voltage | TDIFF value | Voltage compensation (TDIFF Vcomp) |
|---|---|---|---|
| 20° C. (Room temp) | 16 V | 15 | 0 |
| 20° C. (Room temp) | 13 V | 26 | (26 − 15) = 11 |
| 20° C. (Room temp) | 10 V | 35 | (35 − 15) = 20 |
| 20° C. (Room temp) | . . . | . . . | . . . |

$TDIF_{Vcomp}$=F(Voltage) is an exponential function and may be represented by:

$$X_K = X_{k-1} + (X_{k-1}/4 + X_{k-1}/8)$$

Figure 5:
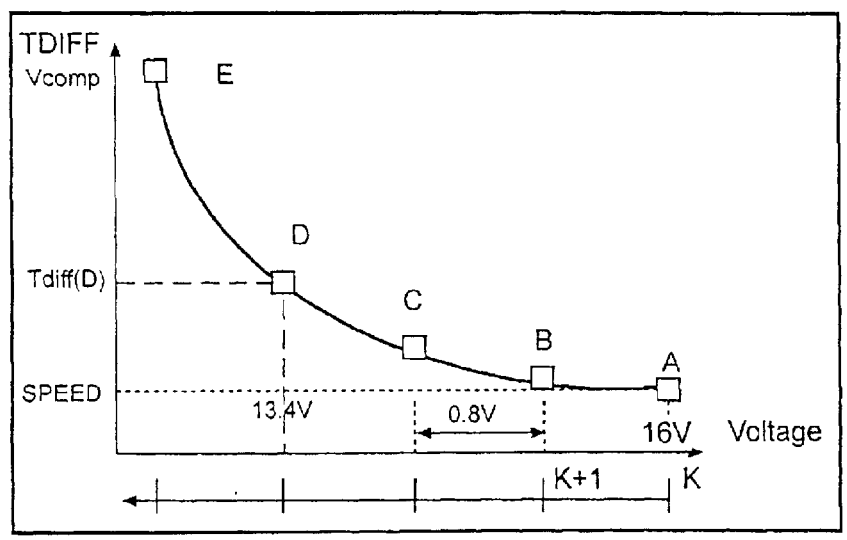
FIG. 5 is a graph depicting voltage compensation.
Figure 6:
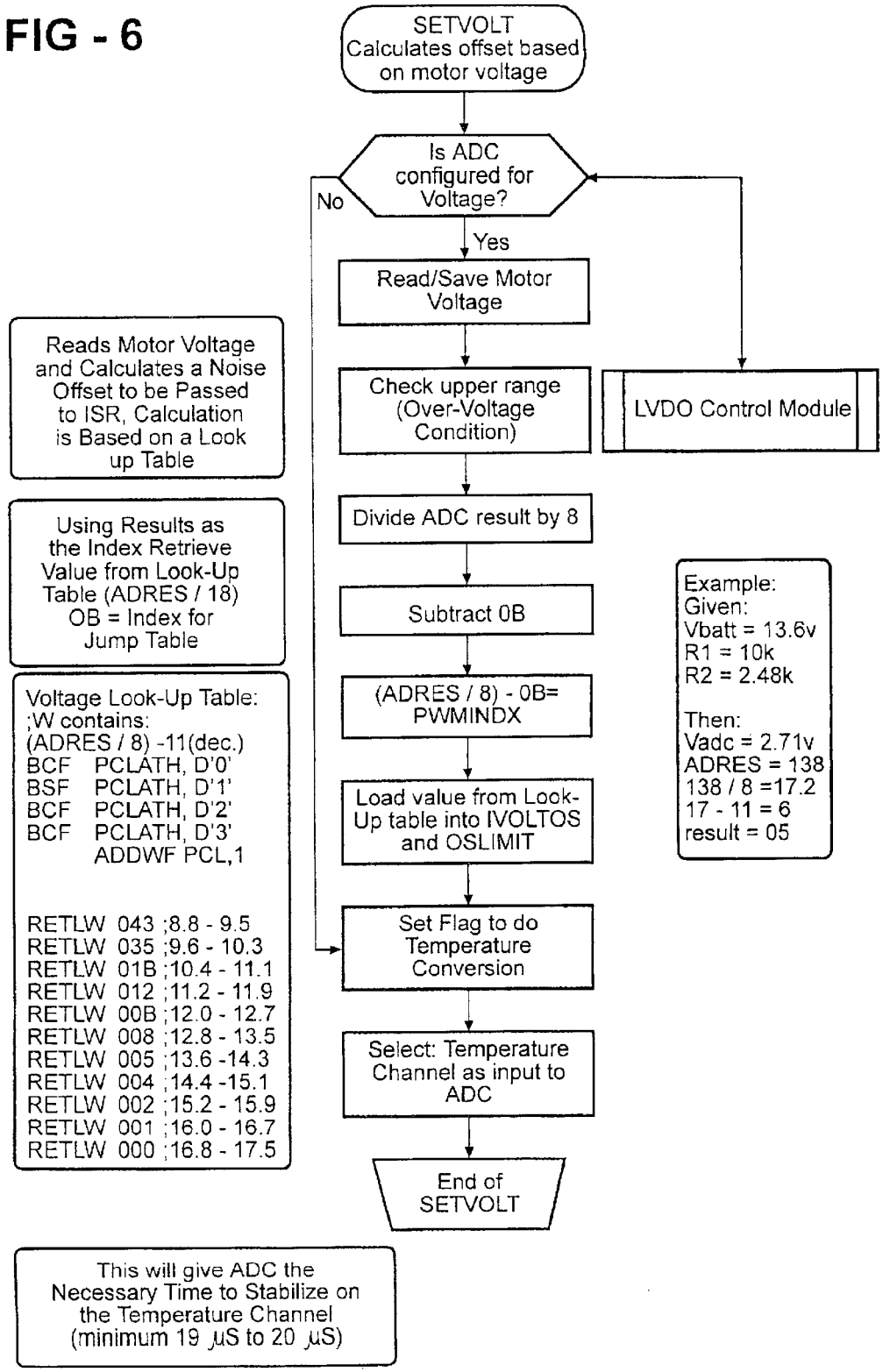
FIG. 6 is a flow chart depicting the control process for determining voltage compensation.

This equation may be solved at any system voltage level. For example, as shown in FIG. 5, a system voltage of thirteen point four V can be calculated. A measured TDIFF value is established for each different voltage and assigned a voltage compensation value as shown in the lookup table in FIG. 6, which depicts the program steps for determining the voltage compensation value.

Temperature Compensation

Ambient temperature also affects the movement of the motor armature. For a particular voltage level, such as thirteen volts, different TDIFF values are evaluated and assigned a temperature compensation value, from the lookup table in FIG. 7B, by example.

Figure 7A:
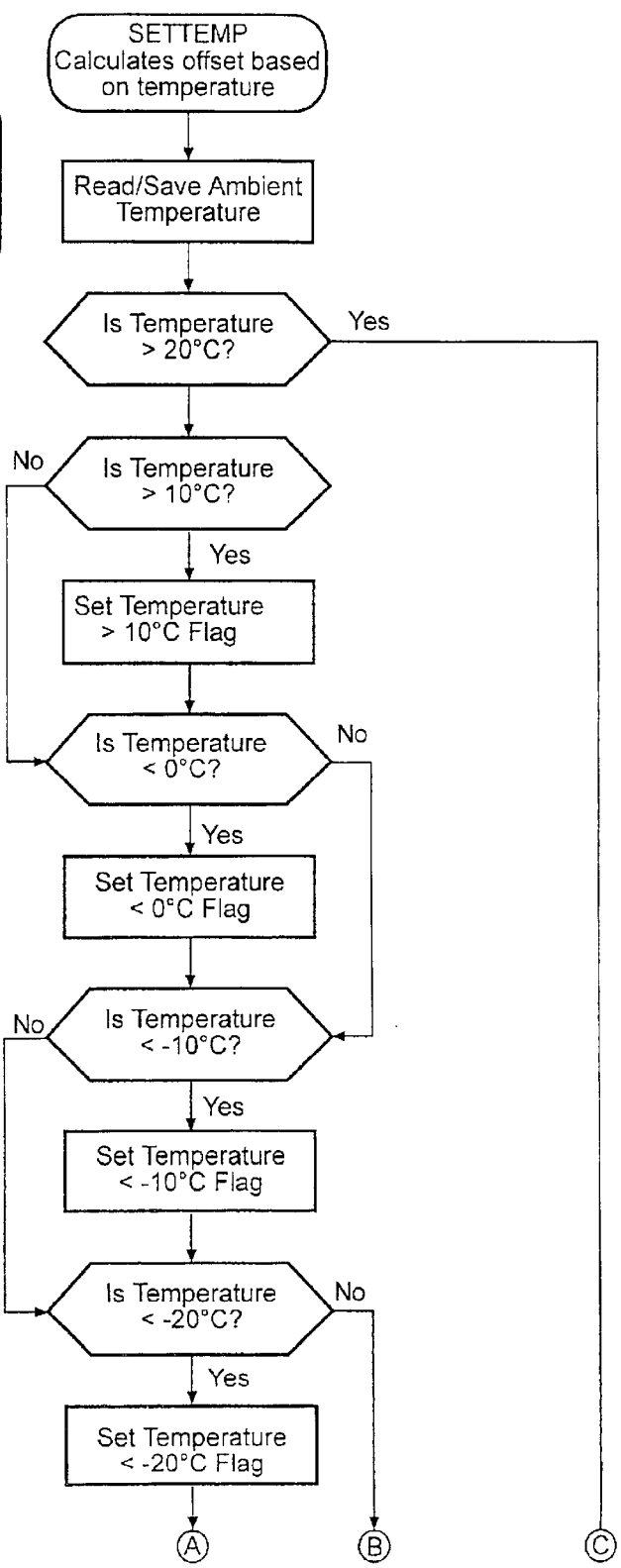
FIGS. 7A, 7B and 7C are flow diagrams depicting the control process for temperature compensation.
Figure 7B:
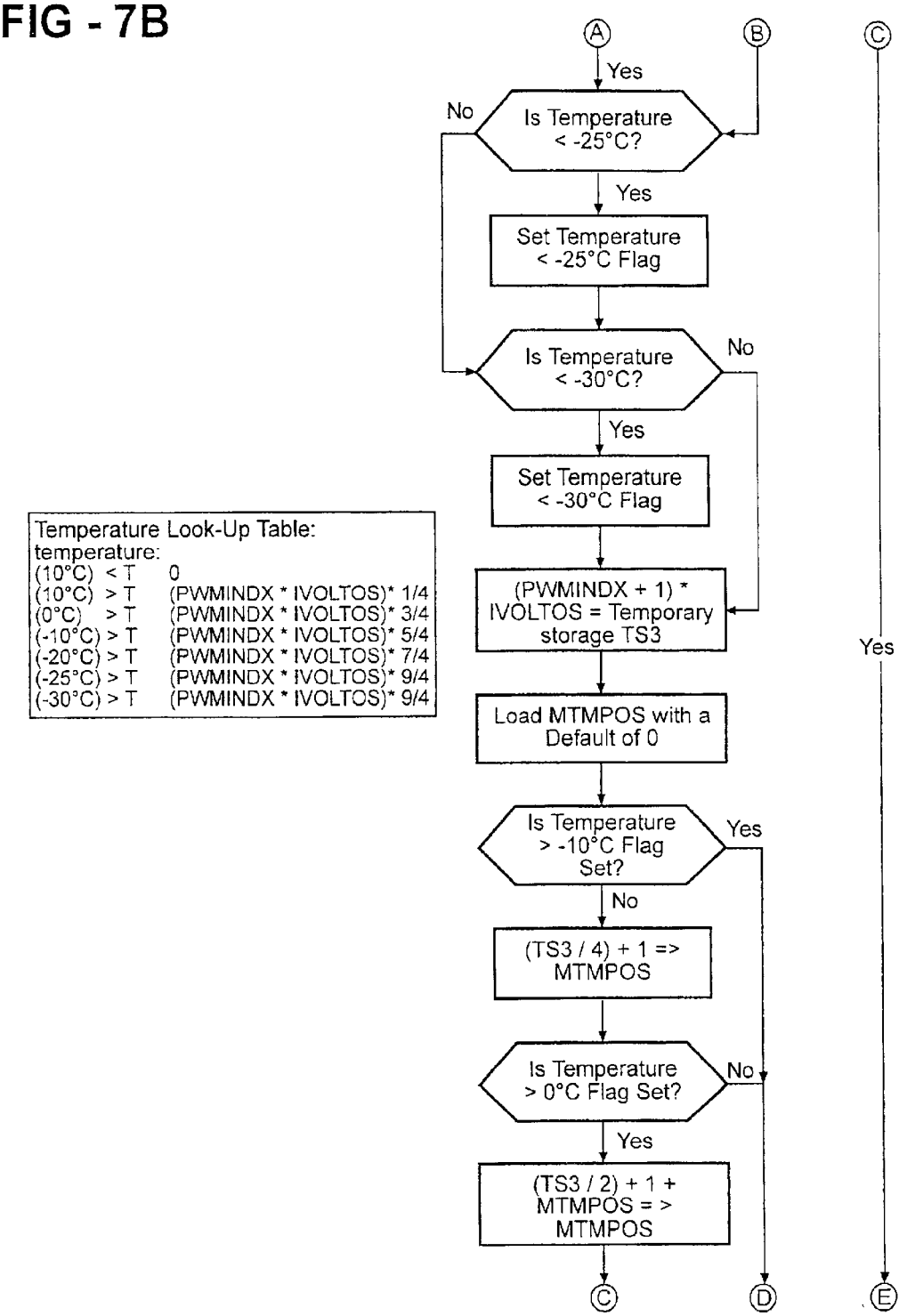
Figure 7C:
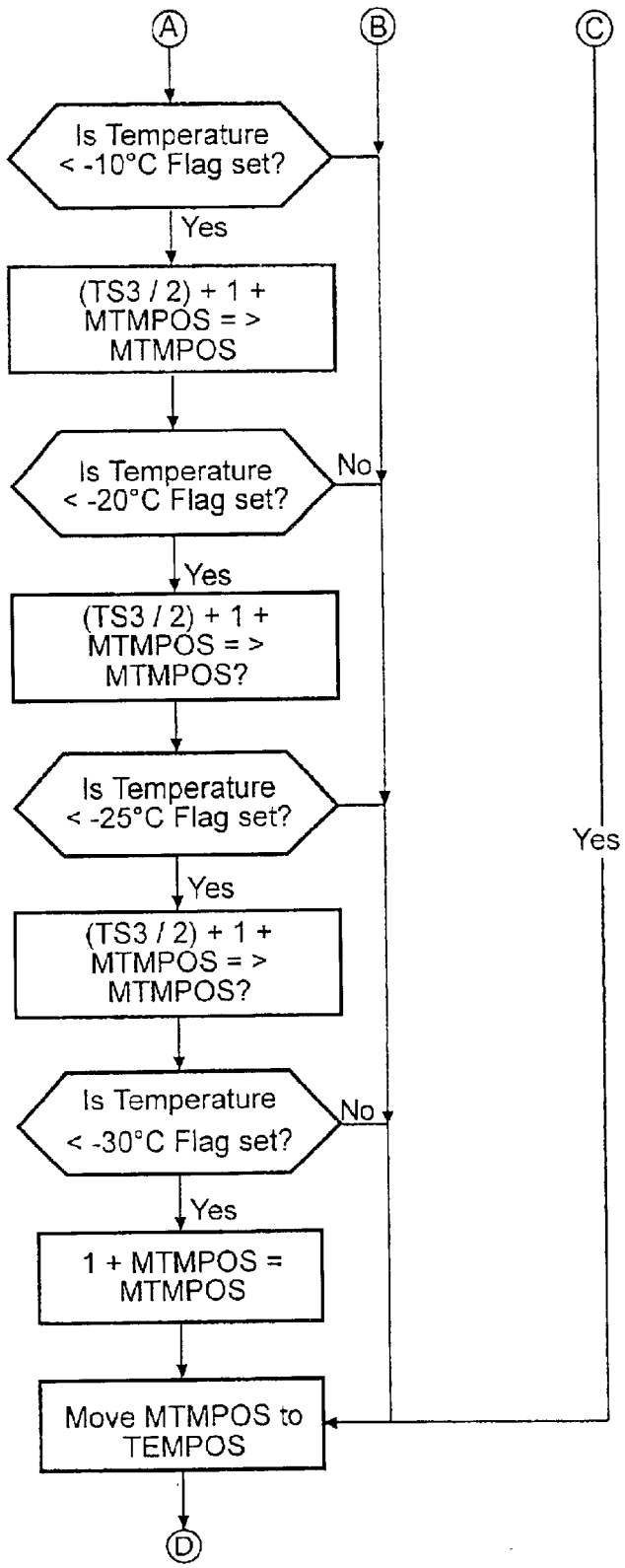

FIGS. 7A–7C depict the program or control steps executed by the controller 20 in determining a temperature compensation value.

Startup Transient

There exists a startup transient on the response of the motor armature speed during the initial stages of a panel movement. This startup transient can last anywhere between seventy milliseconds to three hundred fifty milliseconds over which the panel may move several millimeters.

When power is applied to the motor, the armature speed signal has a transient component and a steady-state component. Most prior art anti-pinch systems do not enable the anti-pinch feature until the transient response dies out. During this time, the panel is closing without obstacle detection enabled. Since the panel may move several millimeters during this time period, a problem can exist if there is an object directly in the panel path of the panel when the motor is initially powered on. Laboratory tests have shown that most systems exert over two hundred N of force on an object when moved toward the closed position in this manner.

A startup transient control sequence according to the present invention has a first step of establishing a first and second boundary for the magnitude of the TDIFF signal at startup. The first boundary is established at zero. The second boundary is calculated based on a measure of the applied voltage and the ambient temperature by the following equation:

$$A*VOLTOS + b*TEMPOS + 1 = \text{Upper Boundary}$$

In the present example, a=0.5 and b=0.5.

Figure 8A:
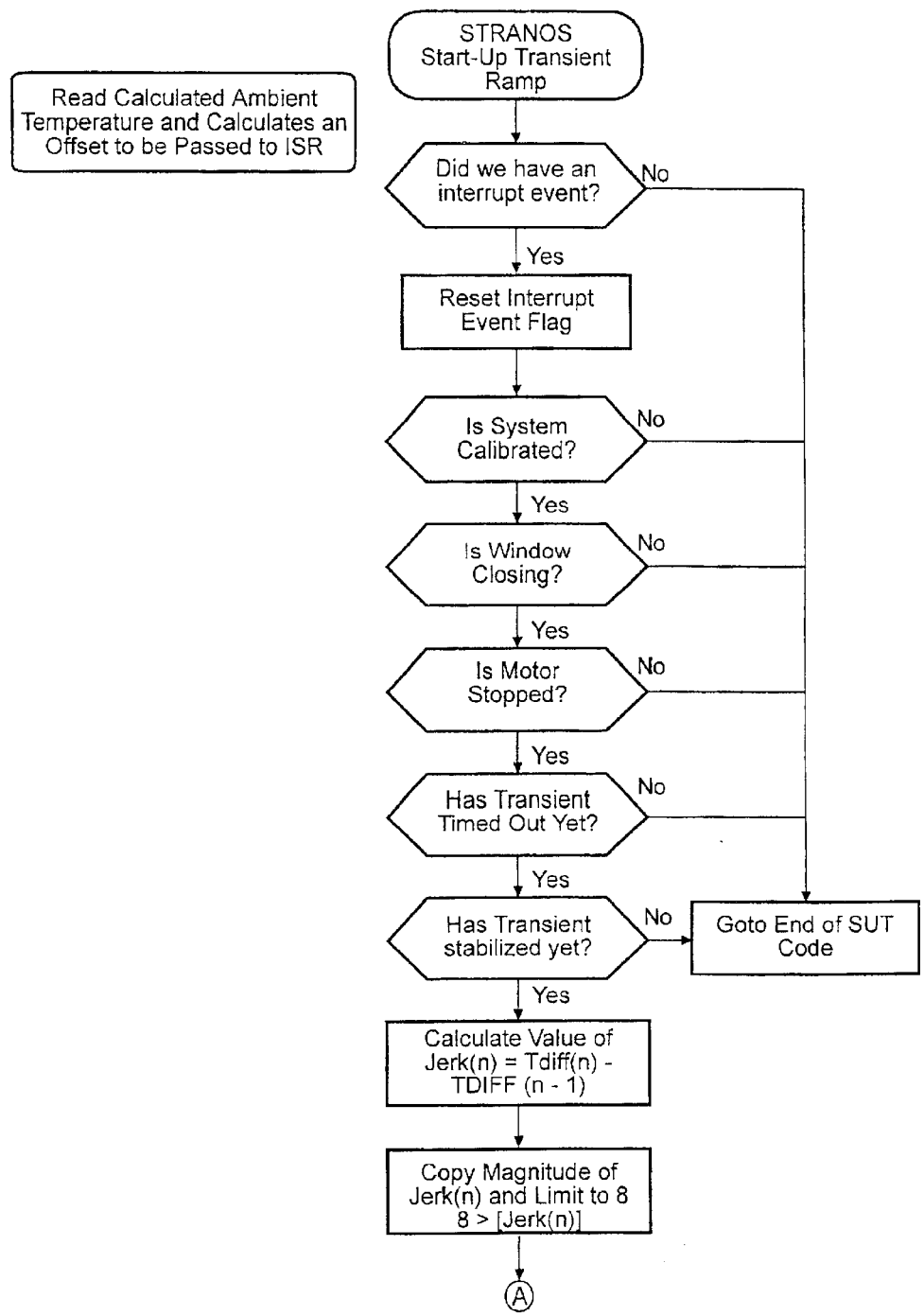
FIGS. 8A, 8B and 8C are flow diagrams depicting the control sequence for start-up transient ramp compensation.
Figure 8B:
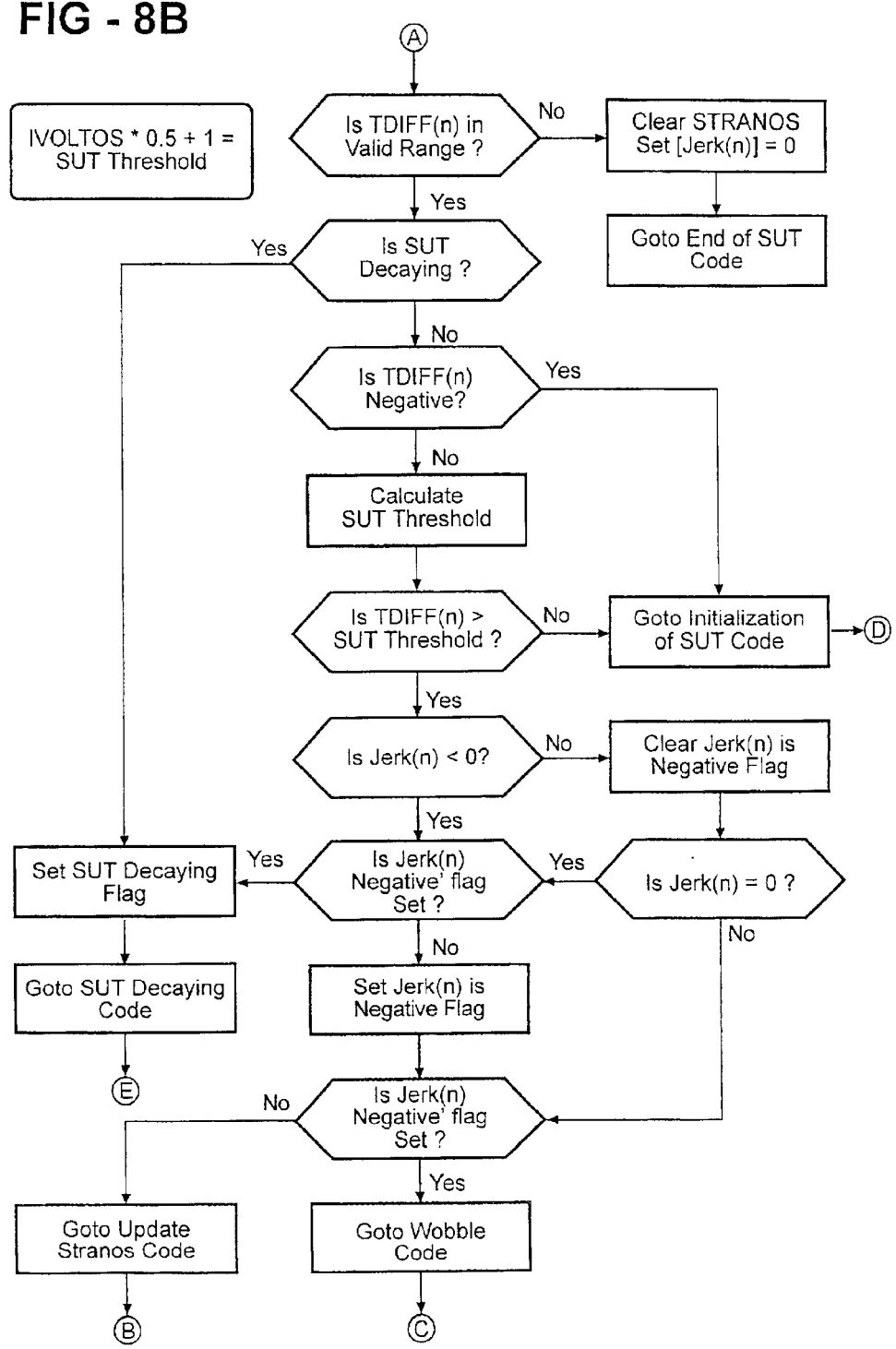
Figure 8C:
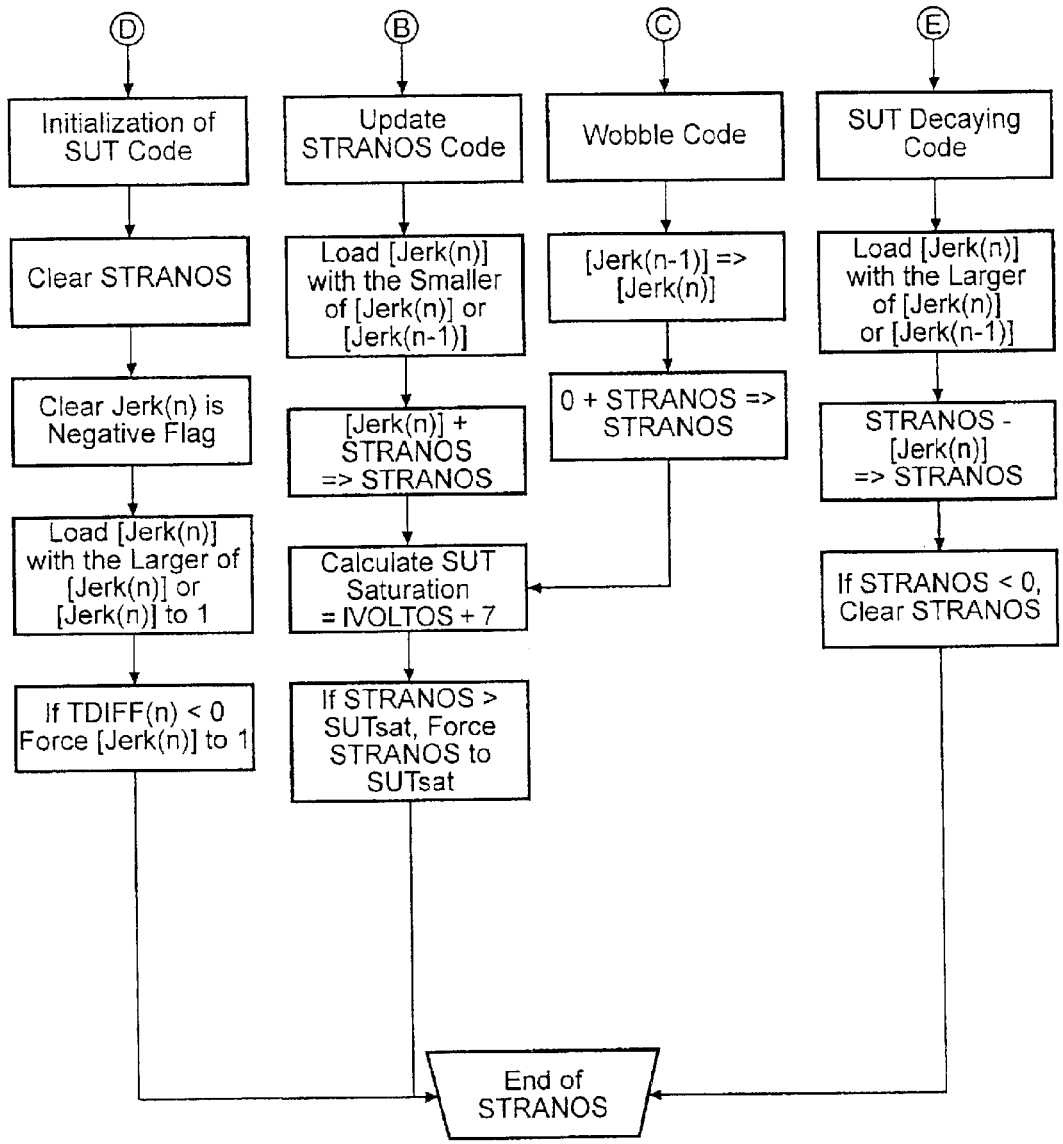

With these boundaries established, the control 20, as shown in FIGS. 8A–8C, then measures the difference between each new TDIFF sample. The control 20 only stores the largest recorded value of:

$$TDIFF(n) - TDIFF(n-1) = JERK(n)$$

and $$TDIFF(n-1) - TDIFF(n-2) = JERK(n-1)$$

Where

IF JERK(n)>JERK(n−1)

Output JERK(n)=>MAXJERK

Else

Output JERK (n−1)=>MAXJERK

Once TDIFF is greater than the second boundary, the largest recorded difference for TDIFF between the second and first boundaries, MAXJERK, is compared to JERK(n) when TDIFF>Second Boundary. However, now the lesser value of JERK(n) is recorded.

FOR TDIFF>Second Boundary;

$$TDIFF(n) - TDIFF(n-1) = JERK(n)$$

Where

IF JERK(n)<MAX JERK

Output JERK(n)=>MAXJERK

Else

Output MAXJERK=>MAXJERK

Once this differentiation takes place, the resultant MAXJERK is added or accumulated in a RAMPOS variable:

$$RAMPOS(n) = RAMPOS(n-1) + MAXJERK(n)$$

In order to keep this compensation function bounded, a saturation limit is calculated based on the applied voltage and ambient temperature. This saturation limit represents the maximum expected overshoot of the TDIFF signal. A general equation for calculating the maximum expected overshoot is given as:

$$a*\text{VOLTOS}+b*\text{TEMPOS}+C=\text{Saturation Limit}.$$

The present aspect uses a=1.5, b=0, c=7.
Where

IF RAMPOS(n)>Saturation Limit

Output Saturation Limit=>RAMPOS(n)

Else

Output RAMPOS(n)=>RAMPOS(n)

This process continues until the value of JERK(n)<0 AND JERK (n−1)=<0.

Once the TDIFF signal peaks and begins to decay, the control 20 starts saving the largest difference between TDIFF samples and subtracts this value from the compensation function RAMPOS until RAMPOS reaches zero.

$$\text{RAMPOS}(n)=\text{RAMPOS}(n-1)-\text{MAXJERK}(n)$$

Figure 9:
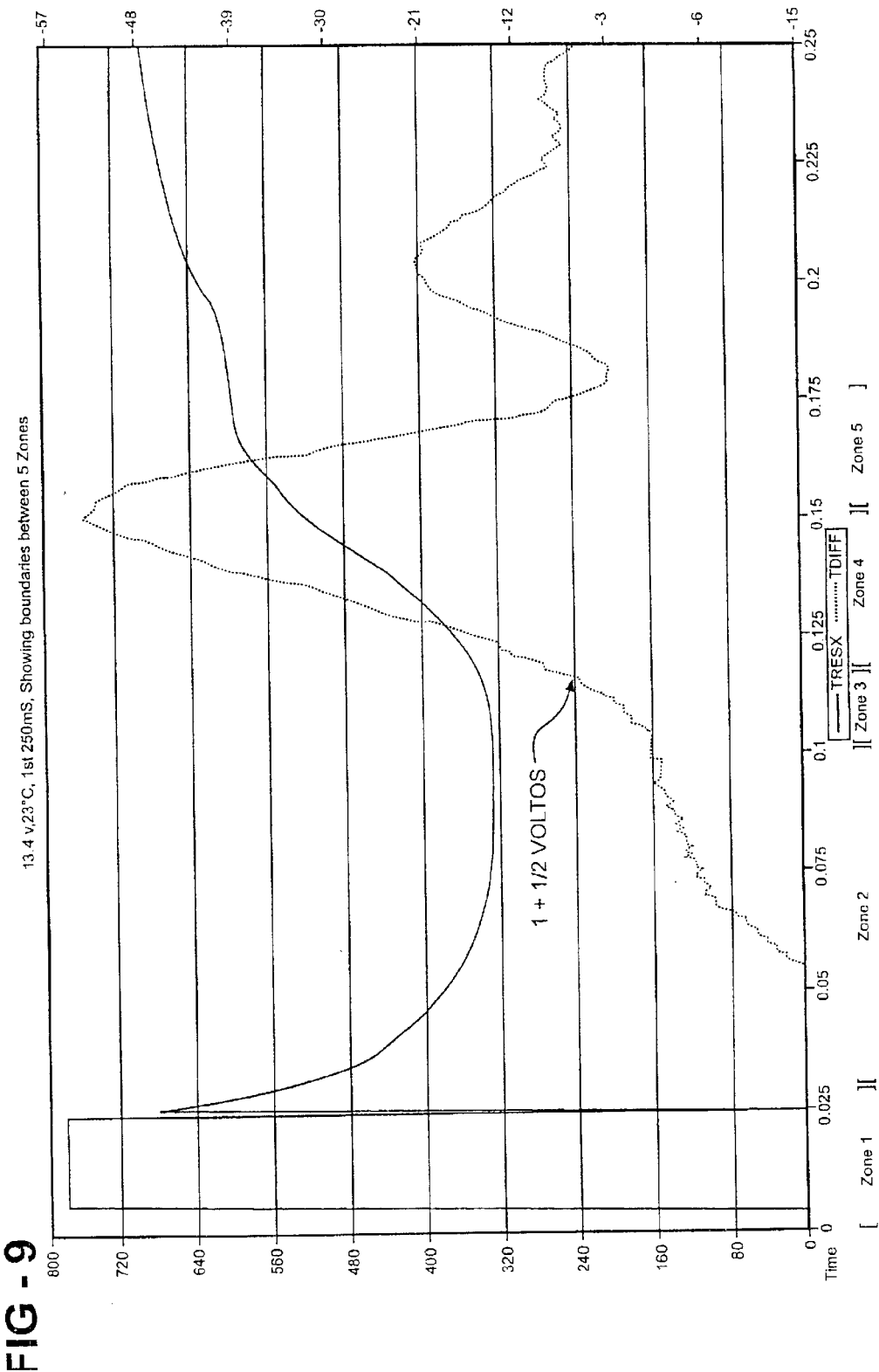
FIG. 9 is a graph depicting startup transient compensation.

FIG. 9 shows a sample of the TDIFF signal with the horizontal time axis partitioned into different zones showing how the TDIFF signal is analyzed and manipulated.

In Zone one, the transient compensation control waits until the input buffers are filled with valid data. In Zone two, the variables and flags used in the compensation algorithm are initialized. In Zone three, the control records the largest differential between TDIFF samples. In Zone four, the control records the smallest differential between TDIFF samples, and adds/accumulates this value to create a compensation function for the startup transient. The accumulated value is never allowed to grow beyond a Saturation Limit. In Zone five, the control records the largest differential between TDIFF samples, and subtracts this value from the compensation variable RAMPOS. Zone five ends when either the value of the RAMPOS variable reaches zero, or a limit timer runs out, or TDIFF>0. This limit timer correlates to the expected setting time of the mechanical panel system. When the limit timer times out, it is expected that the transient response of the system has died out, and compensation is no longer required.

Endzone Ramp

Figure 10:
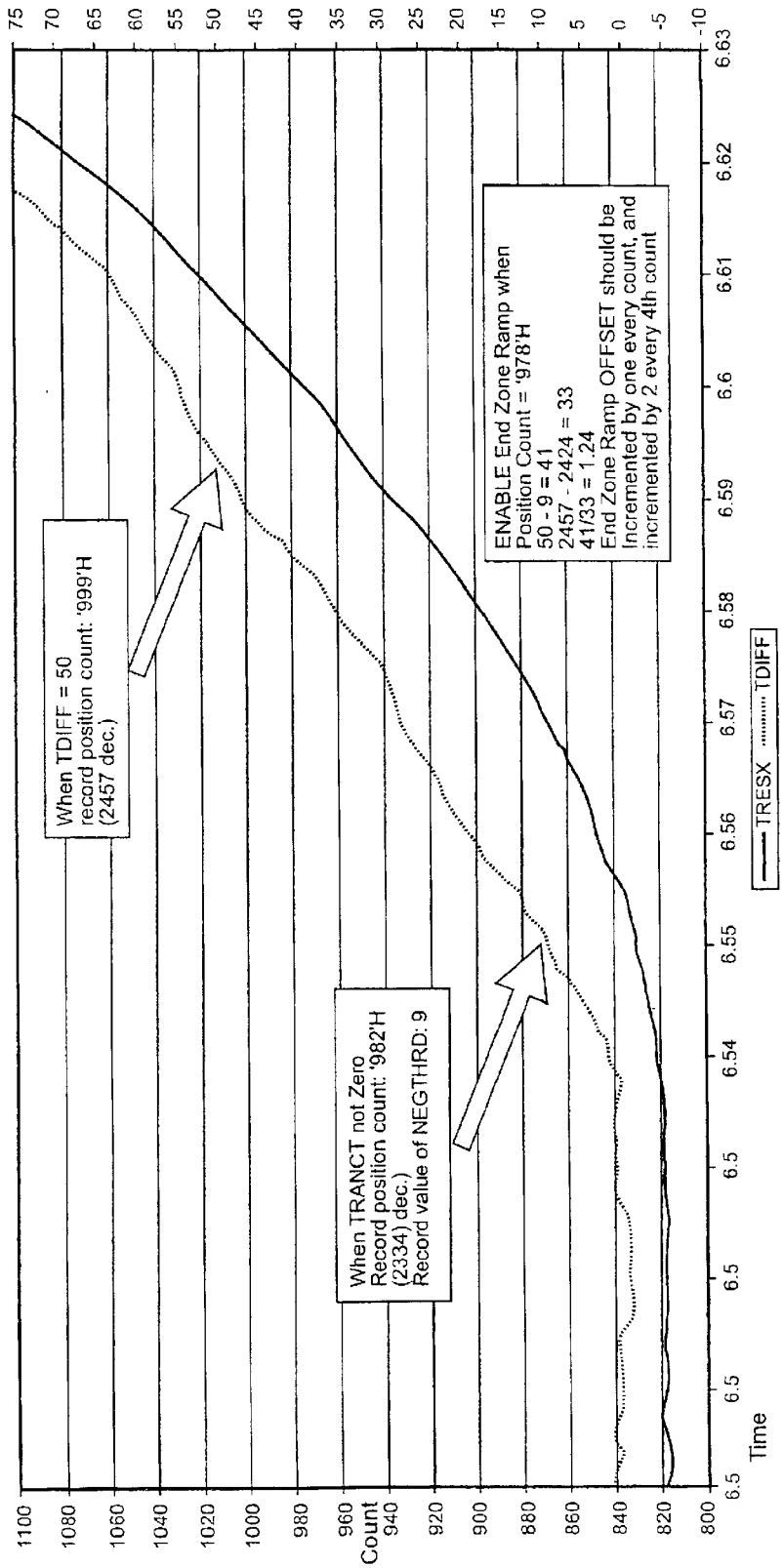
FIG. 10 is a graph depicting endzone ramp compensation.

When the controller 20 is powered on, it is in a calibration state because, when it lost power, it had no way to save position information. When the controller 20 receives a switch 18 input command to power the motor 16 in the closed direction (all the functionality of which is hard coded in the FLASH program memory), it records a count of the number of hall pulses until a stall condition occurs (when the panel is fully closed into the upper seals). A stall condition is when the motor armature 28 turns less than 22.5 degrees in one hundred thirty-one milliseconds. The controller 20 looks for several events while the panel is closing. The controller 20 records the TDIFF signal when the panel first contacts the seal. Then, when the controller 20 receives a switch 18 input command to power the motor 16 in the open direction, it records the total number of counts from full closed to full open. Once this occurs, the controller 20 is calibrated, and it knows where the seal begins, and where to turn off anti-pinch. The controller 20 does this by looking for a few key events when the panel is closing into the seals as shown in FIG. 10. When the controller 20 is powered on, it resets the position count to a default constant.

The endzone ramp calibration will now be described. The end of zone ramp function starts incrementing a variable when the panel 10 reaches a predetermined position between the first and second positions. The variable is incremented at a set rate based on a predetermined slope. The position at which the ramp is enabled and the slope of the ramp are determined at system calibration. The end of zone ramp compensation function is designed to keep anti-pinch enabled until the opening is less than a prescribed small amount, such as much less than 4 mm.

Figure 11A:
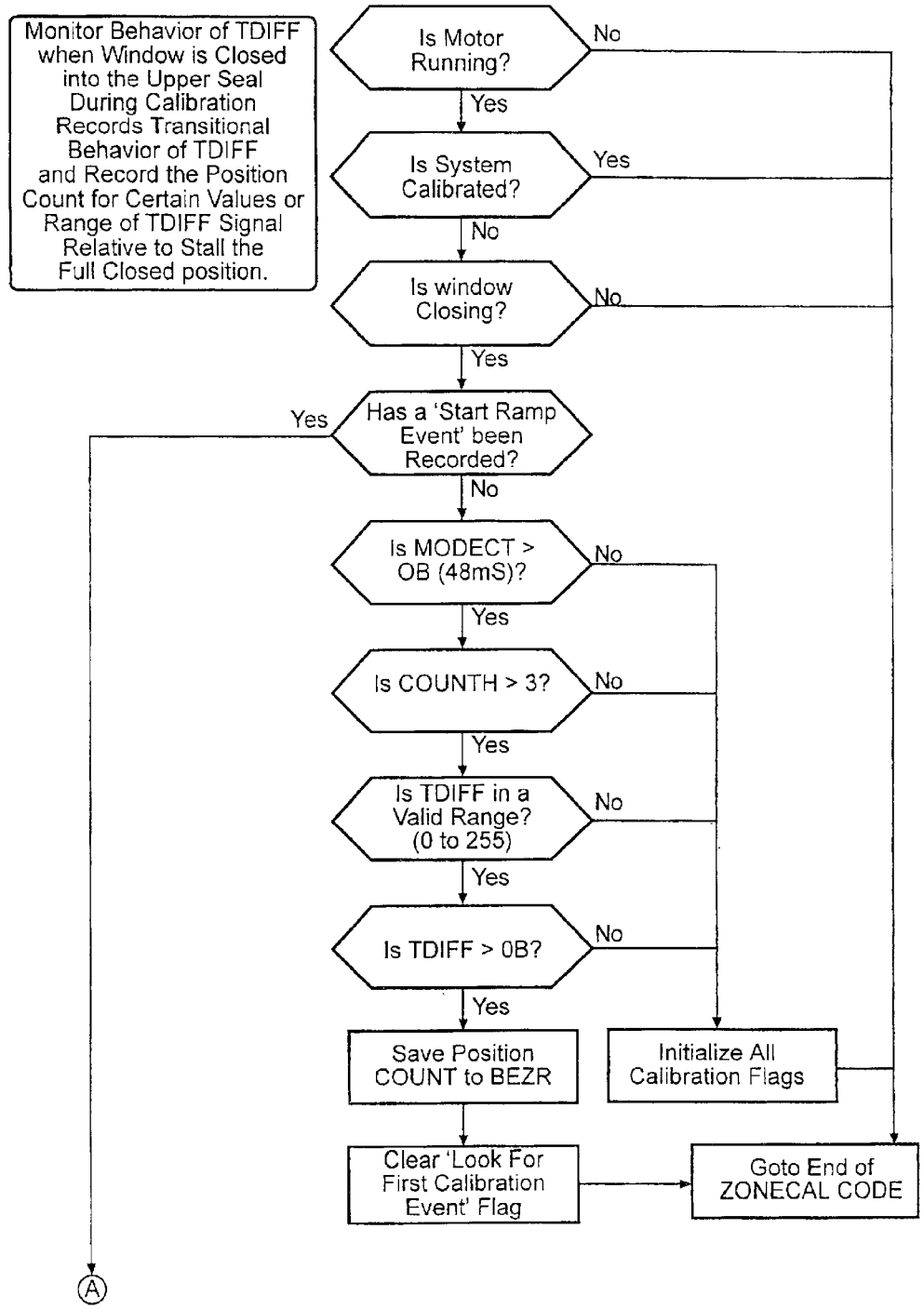
FIGS. 11A, 11B and 11C are flow diagrams depicting the control sequence for endzone ramp compensation.
Figure 11B:
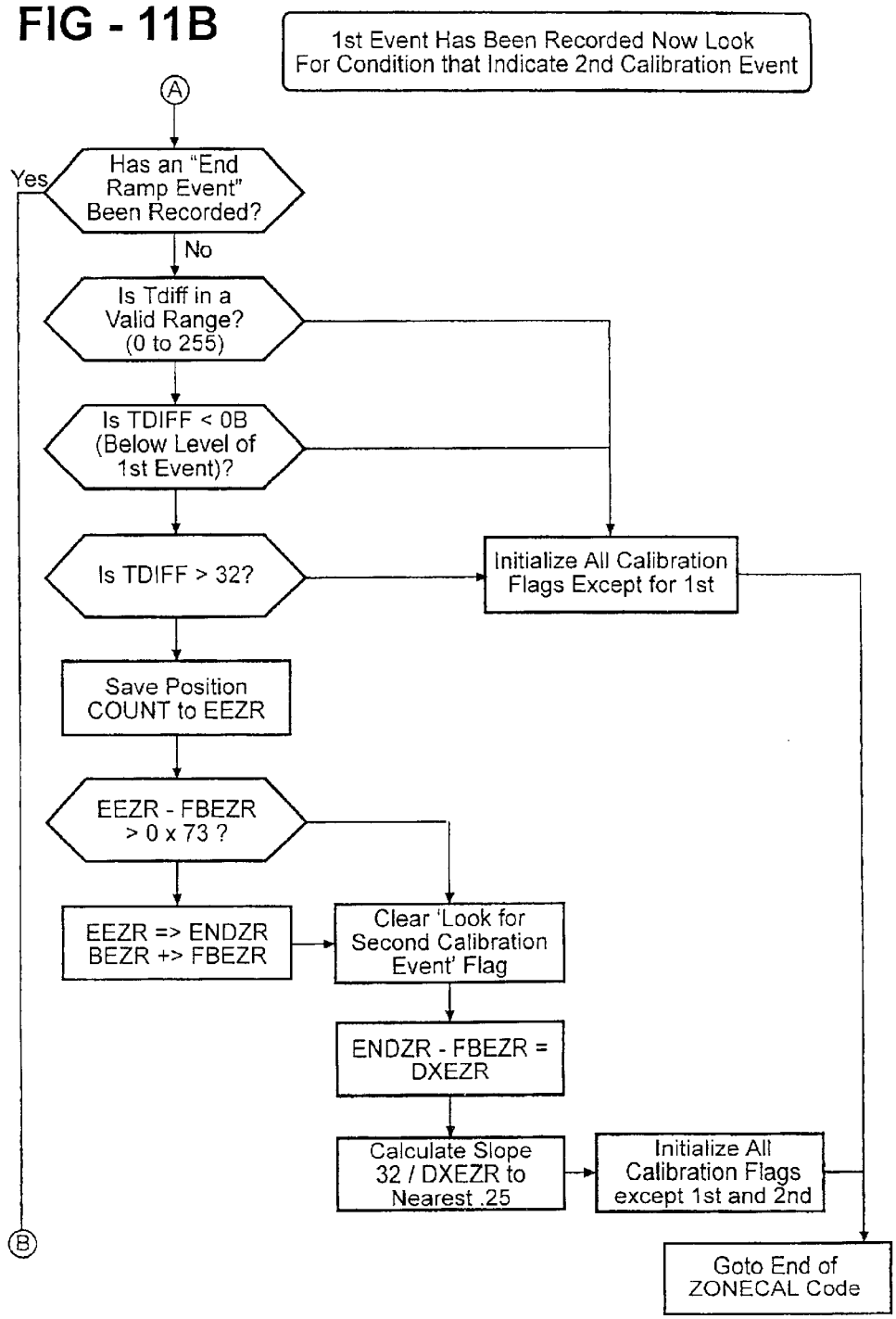
Figure 11C:
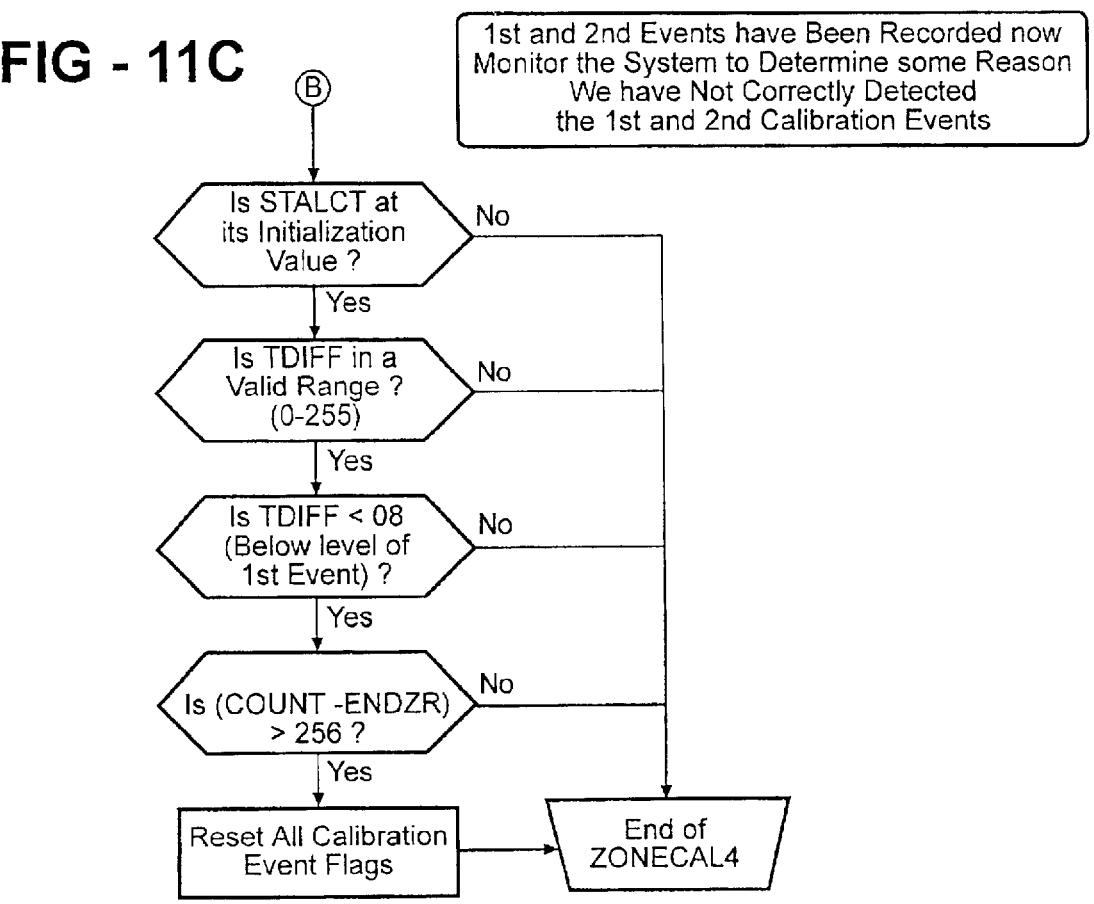
Figure 13A:
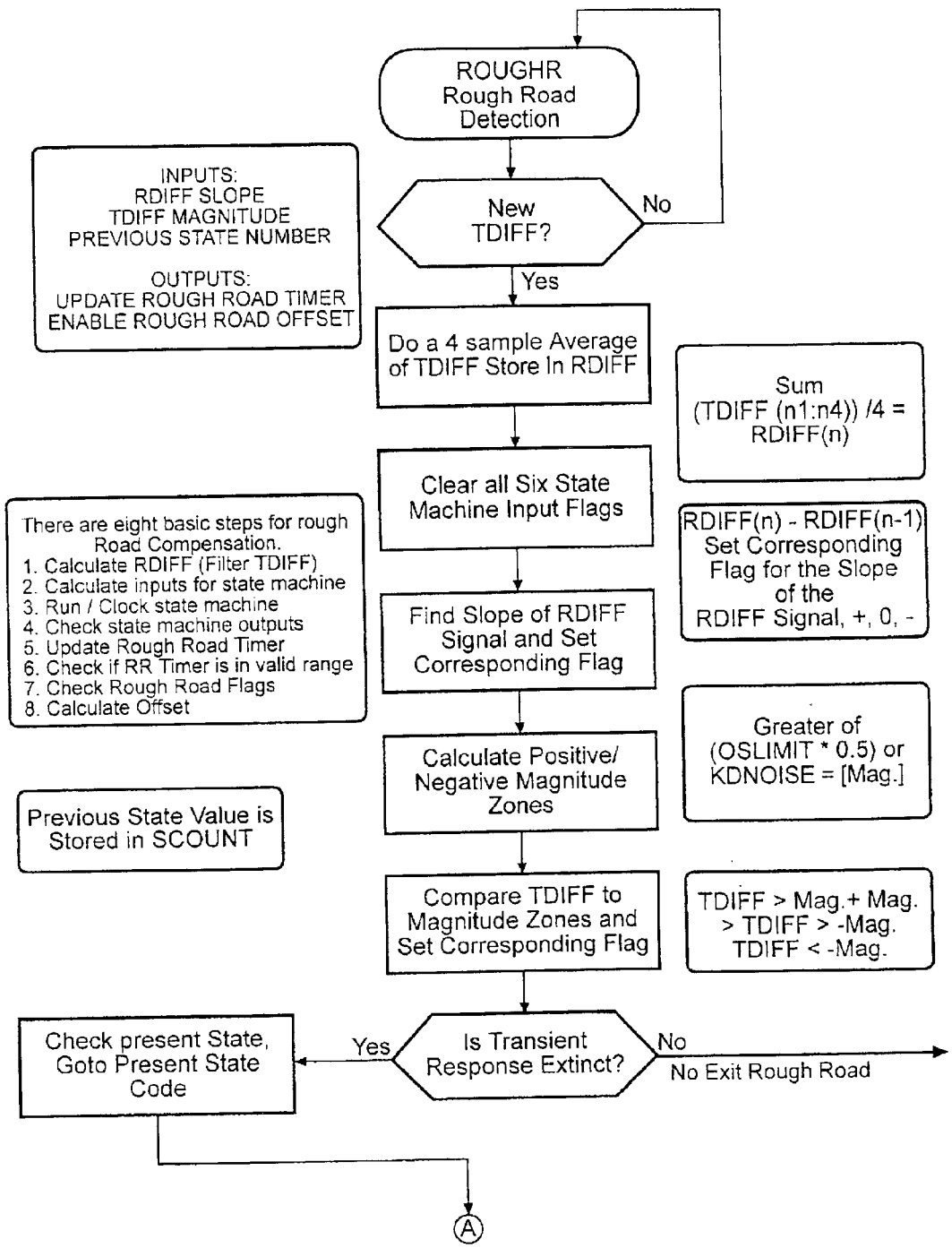
Figure 13B:
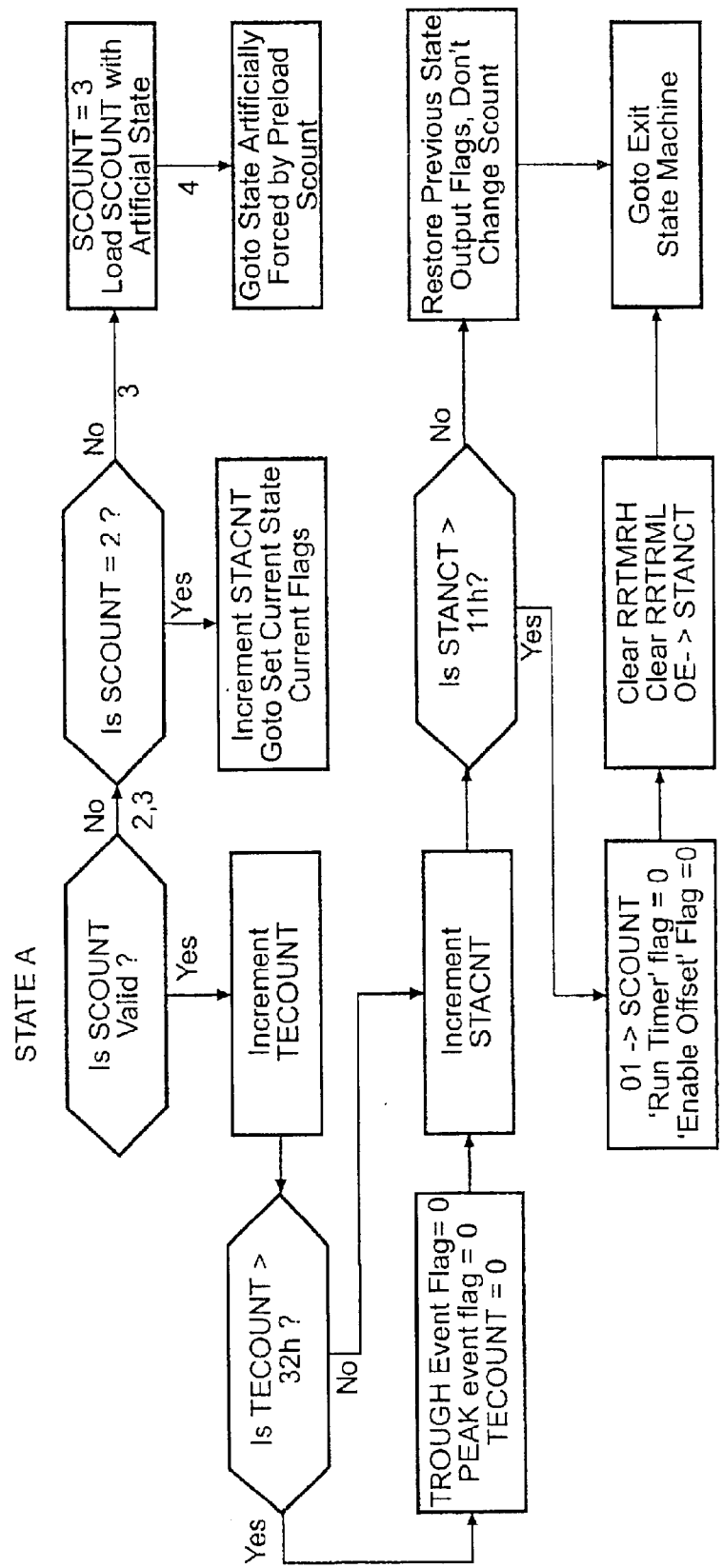
Figure 13C:
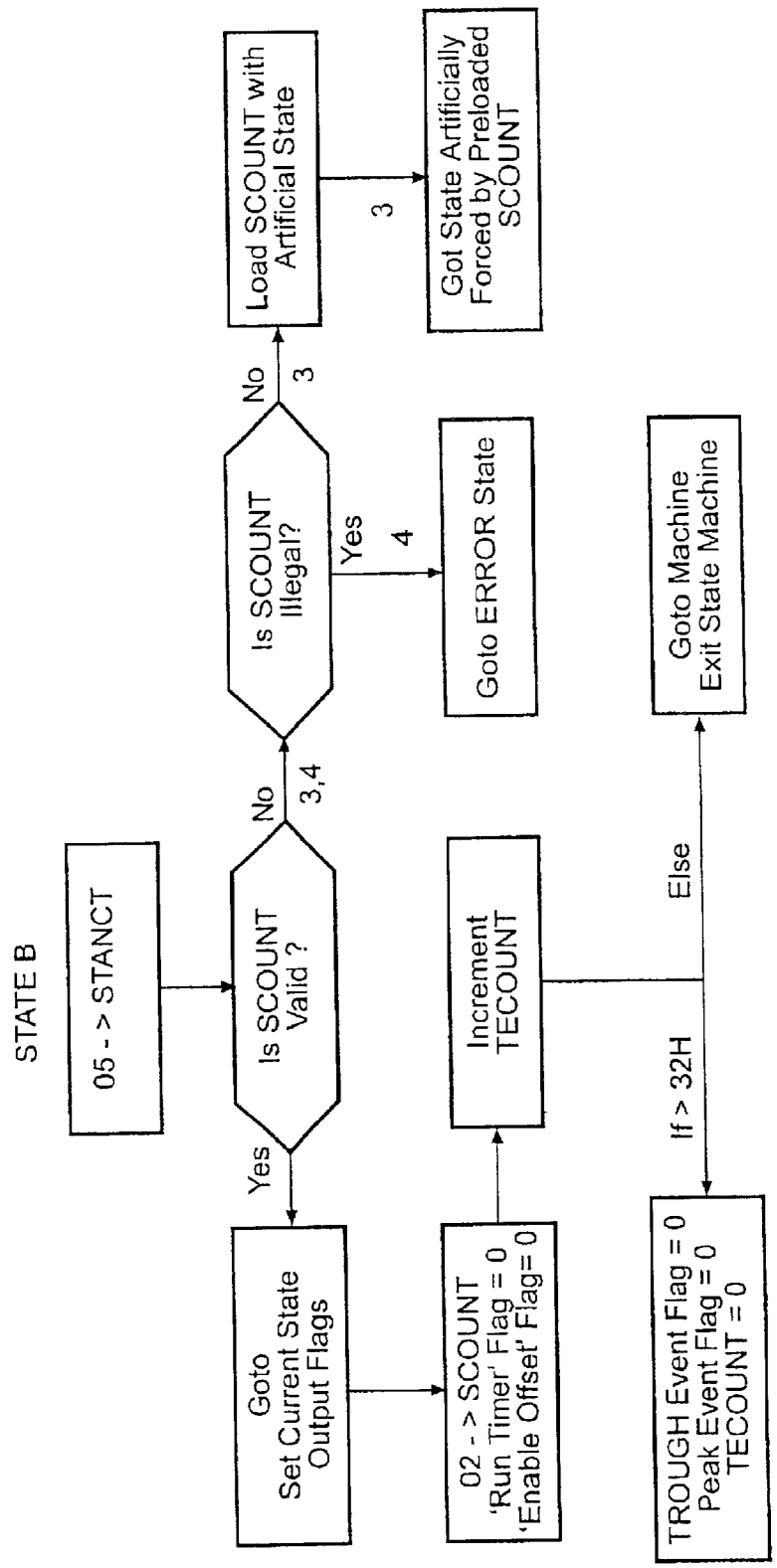
Figure 13D:
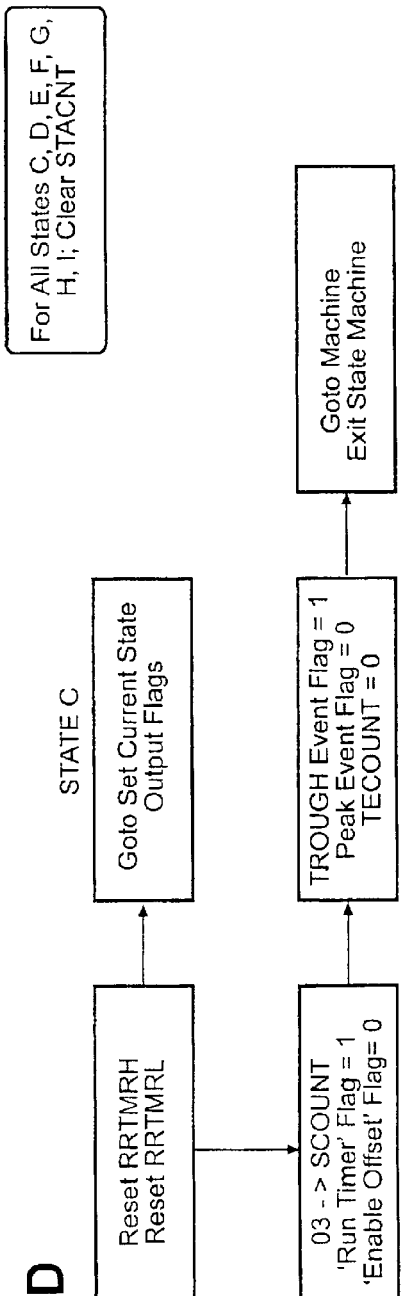
Figure 13E:
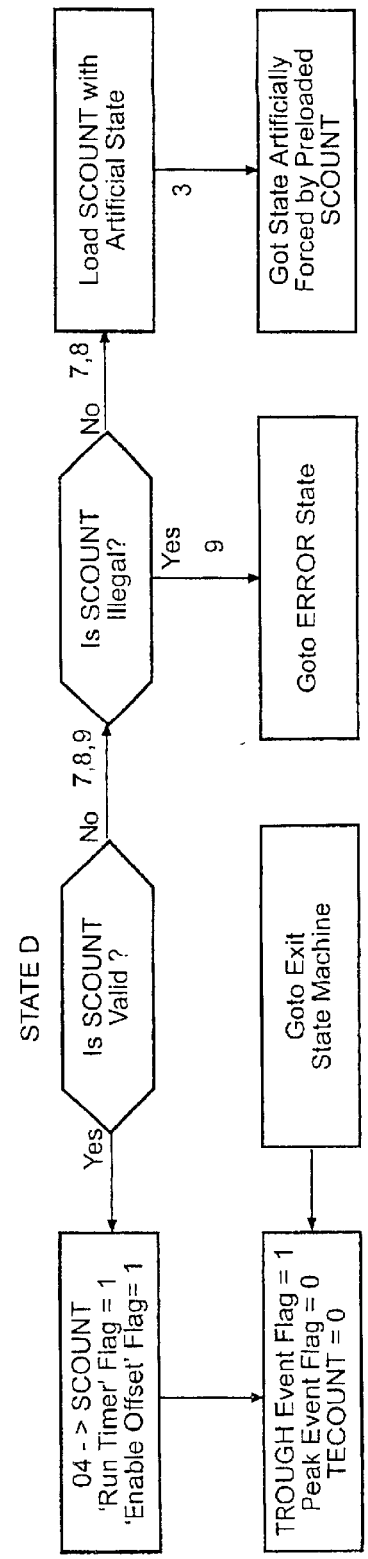
Figure 13F:
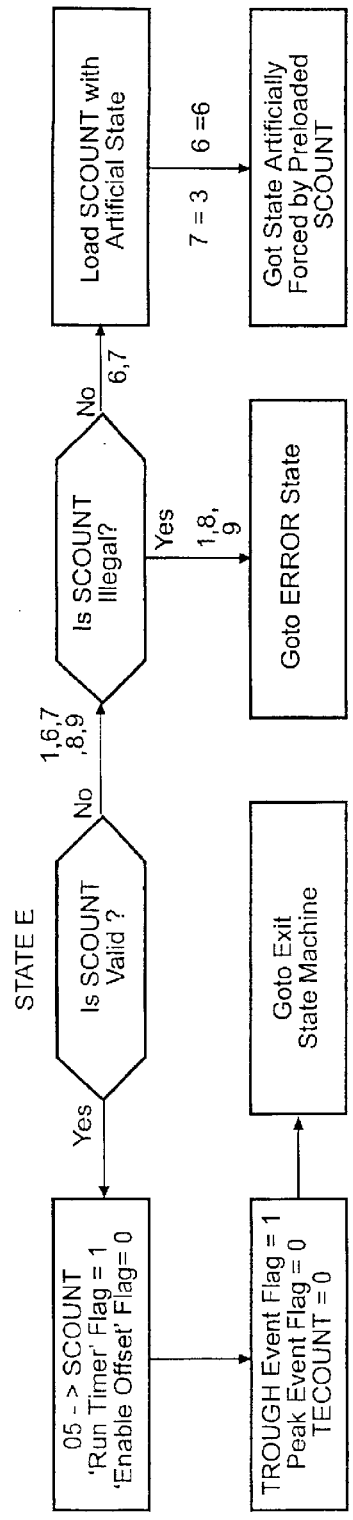
Figure 13G:
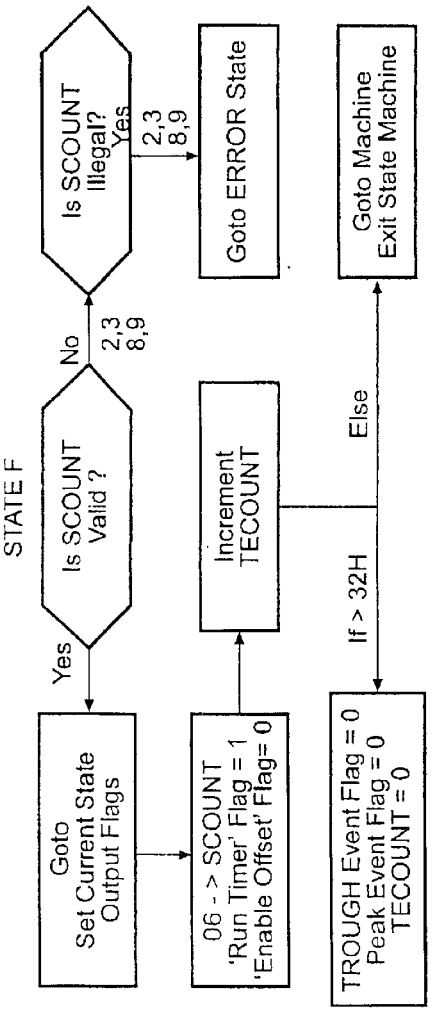
Figure 13H:
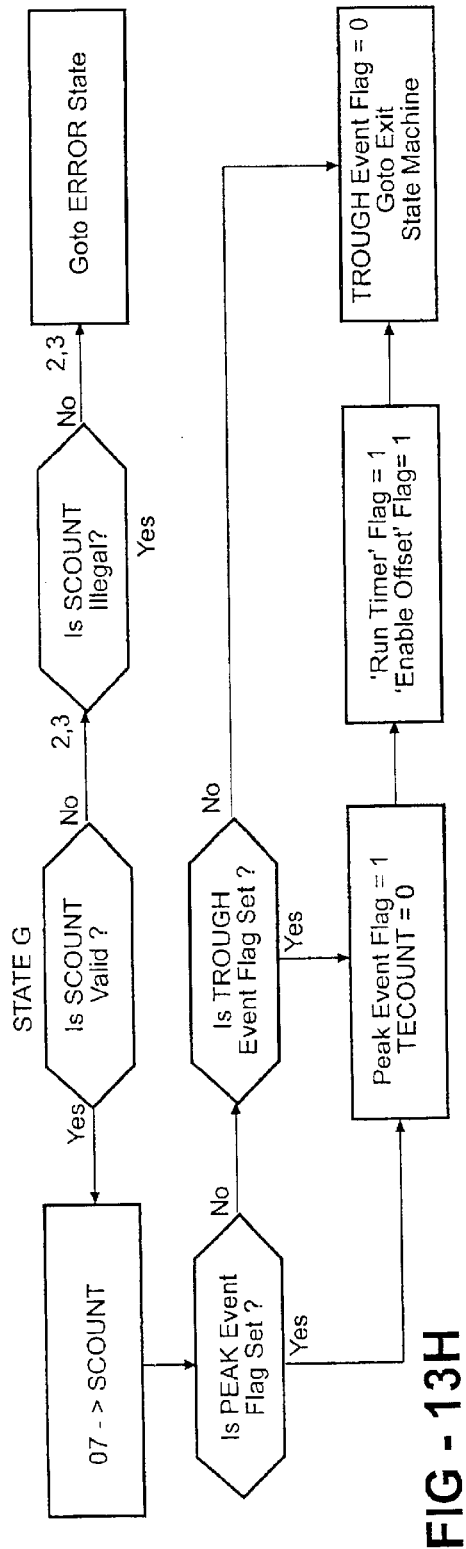
Figure 13I:
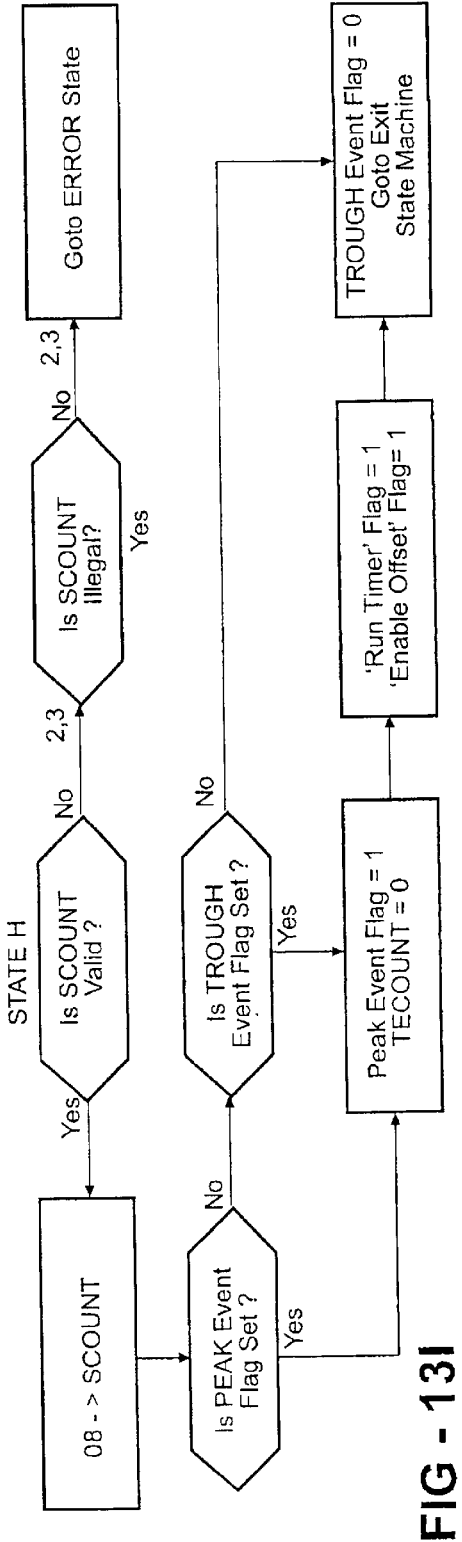
Figure 13L:
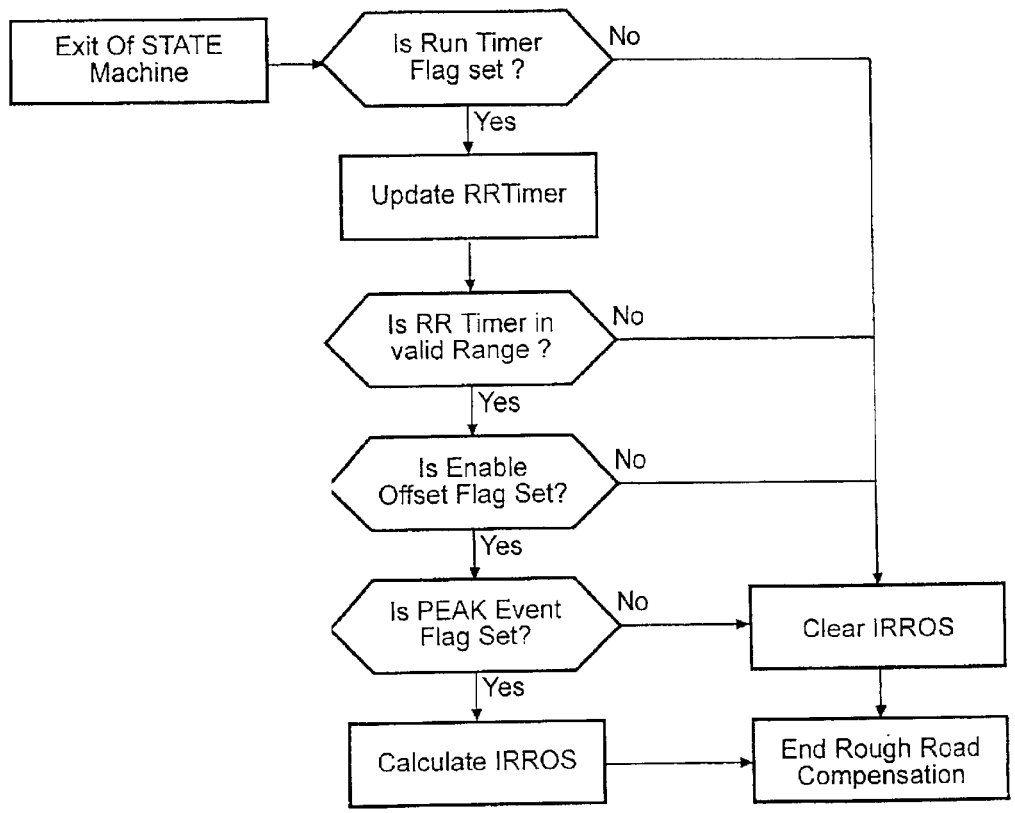

The control program steps for implementing the end zone ramp calibration are shown in FIGS. 11A–11C. First, the controller 20 requires that the motor 16 has been running long enough that the transient response at startup has died out. Second, the panel 10 has to have traveled at least two inches before encountering the upper seals. If these two conditions have been met, then the controller 20 begins to monitor the TDIFF signal for certain behavior. First, the controller 20 records the value of the position count the first time TDIFF is greater than a threshold level, generally around 8–15 counts. (this is called the beginning of the Endzone Ramp) Next the controller 20 records the position count the first time TDIFF is greater than 50 counts. (This is called the ending position for the Endzone Ramp.) If, after either of these events, the value of TDIFF drops below the first threshold, the recorded values of the position count are not over-written. The recorded values of the position count are only over written when TDIFF becomes greater than the lower threshold is more than a set number of counts from the position count that was recorded the first time TDIFF became greater than the lower threshold. Once the controller 20 registers a stall event, the controller 20 compares the final position count to the position count recorded when TDIFF crossed the lower threshold. If the difference is less than a certain amount, then the recorded positions are assumed to be valid. The controller 20 then calculates the slope of TDIFF between the two thresholds. The result of this rise over run calculation is stored in memory, as well as the position counts of where TDIFF crossed the lower and upper boundaries. Then, when the panel or window is run down (or the sunroof is opened), the position count when stall occurs is loaded as the true default open position, and the position counts recorded in memory for the beginning of the Endzone Ramp and the end of the Endzone Ramp are shifted by a set index. At this point, the system is calibrated.

When the system is run closed with anti-pinch enabled, an Endzone Ramp compensation is included in the TOTALOS when the position count crosses the position recorded in memory as the beginning of the Endzone Ramp. This compensation variable is increased as a function of the slope between the beginning of the Endzone Ramp and the end of the Endzone Ramp. Anti-pinch is enabled until the position count is greater than the position count recorded in memory as the end of the Endzone Ramp. This means that obstacle detection is enabled until the panel is well within the seals. In order for the system to maintain calibration over the life of the product, this algorithm can be rerun during the life of the product. This means any drift of the seal position relative to the motor rotation can be eliminated. Anytime a full-closed position is recorded that is greater than the full-closed position recorded when the system was calibrated, then the beginning and ending of the Endzone Ramp function is shifted by this differential. This assumes that the total travel distance will only increase over the life of the product, which has been shown to be true in laboratory tests. The algorithm described herein allows for a controller 20 to be placed on any panel and regardless of the tolerance stackups of that particular motor-regulator-panel-frame assembly, the controller 20 will be able to calibrate itself so that the zone where anti-pinch is active will always detect at least a 4 mm object. Also, slight weighted offsets can be introduced when calculating the slope and the locations of the beginning and ending of the Endzone Ramp. These weighted offsets allow a ramp function to compensate for seal/panel designs where the entire edge of the panel does not engage the seal all at the same time.

Rough Road Compensation

Figure 12:
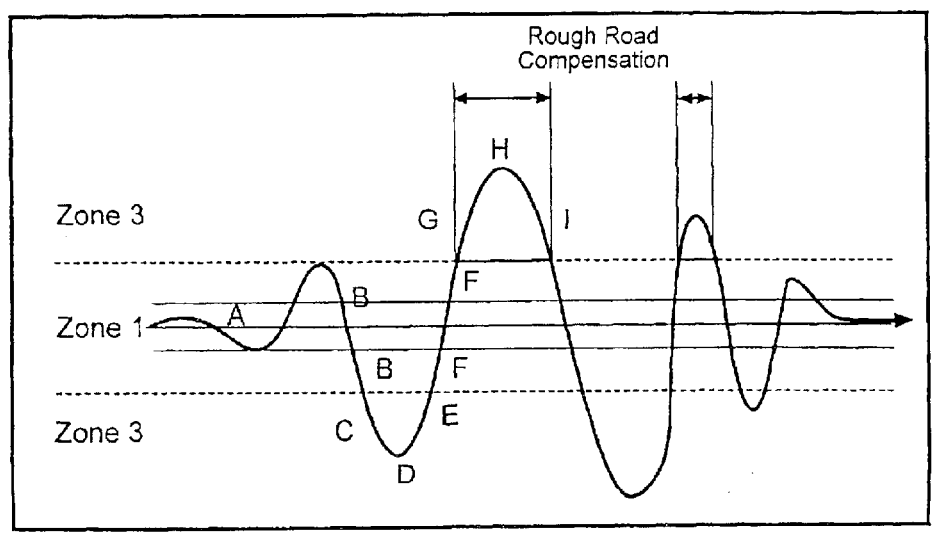
FIG. 12 is a graph depicting Tdiff signal variations during rough road conditions.

The controller 20 looks for a rough road condition by analyzing the behavior of the TDIFF signal, and mapping how the TDIFF signal changes with respect to time and sample count as shown in FIG. 12. Rough road conditions cause an oscillation and an acceleration of the panel or window glass. This acceleration of the panel mass produces a reaction force at the motor 16. The acceleration of the motor 16 oscillates positive and negative at the passband frequency of the vehicle suspension and the panel lift regulator. This oscillation can be characterized and cancelled out by mapping the expected response of the motor acceleration on rough road and then by constantly analyzing the acceleration of the armature to determine if the current motor acceleration has the same profile. This is a pattern recognition algorithm.

There are several distinct steps for rough road compensation as shown in FIGS. 13A–13L. First, an analysis of the TDIFF signal is done in order to generate six input flags for the state machine. The inputs are passed to a state machine set up by the controller 20. Next the output flags of the state machine are acted on. If necessary, a frequency timer is updated that measures the fundamental period of the TDIFF signal. Then a check is made if this fundamental frequency is within a valid range (the passband of the suspension and panel lift regulator). If it is, and if there has been a valid progression through the state machine, then an offset is calculated to be passed to the Interrupt Service Routine described later.

Specifically an average for TDIFF is calculated, $$(TDIFF(n)+TDIFF(n-1)+TDIFF(n-2)+TDIFF(n-3))*0.25=RDIFF(n)$$

Then the slope of the average RDIFF signal is determined.

$$RDIFF(n)-RDIFF(n-1)$$

The result of this calculation is used to set one of three flags:

FLAG0: slope of RDIFF signal is negative
FLAG1: slope of RDIFF signal is zero
FLAG2: slope of RDIFF signal is positive Next, the magnitude of TDIFF(n) is classified in one of three categories:

FLAG 3: TDIFF(n)<-(KDNOISE +OSLIMIT(n))
FLAG 4: -(KDNOISE+OSLIMIT(n))<TDIFF(n), (KDNOISE+OSLIMIT(n))
FLAG 5: TDIFF(n)>(KDNOISE+OSLIMIT(n))

Where KDNOISE is a measure of the minimum noise possible in a system, typically 2–10 and OSLIMIT(n) is a measure of the noise variation as a function of VOLTAGE, typically an exponential function of voltage.

Then these six input flag bits are passed to the state machine. The state machine checks the current state as indicated by the six input flags. Based on the previous state, the state machine maps to a state with the correct output flags.

The state machine has two standard output flags:
FLAG 6: 0=disable rough road timer
1=enable rough road timer
FLAG 7: 0=disable rough road offset
1=enable rough road offset The state machine has nine basic states, one error state, and one meta-state. The basis states are labeled A through I. Using the FLAGx designations above, the basic states A through I are:

| INPUT | STATE | OUTPUT |
|---|---|---|
| 010010 | STATE A | 00 |
| 010001 | STATE B | 00 |
| 001001 | STATE C | 00 |
| 001010 | STATE D | 01 |
| 001100 | STATE E | 01 |
| 010100 | STATE F | 01 |
| 100100 | STATE G | 11 |
| 100010 | STATE H | 11 |
| 100001 | STATE I | 11 |

The meta state and the error state are mapped to based on the current input flags and the previous state.

The Error State is a special case that resets the output flags when the transition from one state to another does not represent a logical progression expected for rough road conditions. The Error State has the form:

| INPUT: | STATE X: | OUTPUT: |
|---|---|---|
| XXX XXX | ERROR STATE | 00 |

For example, if the TDIFF signal maps from a STATE A, STATE B, or STATE F to a STATE G, and at not time during the previous 25 samples did the TDIFF signal map to a STATE C, STATE D or STATE E, then the state machine maps to the error state, and stays in the error state until the TDIFF signal has been stable in STATE A for 20 samples.

The meta-state is an unstable STATE A. A counter is used to track how many consecutive times a STATE A occurs. If the meta-state exceeds a set limit, then the output flags FLAG 6 and FLAG 7 are reset. As long as the meta-state counter is below the set limit, the output flag will be unchanged. So if a STATE F precedes a STATE A, the output flags will be 01, as long as the value of the meta-state counter is below the set limit.

A secondary function is incorporated with the primary state machine to keep a better record of past behavior with minimum memory requirements. The secondary function consists of two flags and a counter. The first flag is a TROUGH FLAG. This flag is set when the state machine settles in a STATE C, D, or E. The second flag is a PEAK FLAG. This flag is set when the state machine settles in a STATE G, H or I, and the TROUGH FLAG was already set. When one flag is set, the other flag is cleared. When the state machine settles into a STATE A, B or F, for a set number of samples (50 samples on the H-car, 15 on the CK truck), then both the PEAK FLAG and the TROUGH FLAG are cleared. This implies that a given system should transition between troughs and peaks within a set number of samples in order to be classified as a rough road signal. The counter is a transitional event counter, called TECOUNT. The PEAK FLAG is only set when the TDIFF signal has transitioned from a TROUGH condition to a PEAK condition within a max set of samples. If the PEAK FLAG is set, and the rough road frequency timer is within a valid range, then a compensation value is calculated and stored in the ROUGH ROAD OFFSET.

The interaction between the state machine, the TROUGH and PEAK flags, and the TECOUNT is described by the following table:

| STATE x | TECOUNT | PEAK | TROUGH | TECOUNT+ | PEAK+ | TROUGH+ |
|---|---|---|---|---|---|---|
| STATE A | <32h | X | X | TECOUNT + 1 | X | X |
| STATE A | >32h | X | X | 0 | 0 | 0 |
| STATE B | <32h | X | X | TECOUNT+ 1 | X | X |
| STATE B | >32h | X | X | 0 | 0 | 0 |
| STATE C | X | X | X | 0 | 0 | 1 |
| STATE D | X | X | X | 0 | 0 | 1 |
| STATE E | X | X | X | 0 | 0 | 1 |
| STATE F | <32h | X | X | TECOUNT+ 1 | X | X |
| STATE F | >32h | X | X | 0 | 0 | 0 |
| STATE G | X | 0 | 0 | 0 | 0 | 0 |
| STATE G | X | 0 | 1 | 0 | 1 | 0 |
| STATE G | X | 1 | 0 | 0 | 1 | 0 |
| STATE H | X | 0 | 0 | 0 | 0 | 0 |
| STATE H | X | 0 | 1 | 0 | 1 | 0 |
| STATE H | X | 1 | 0 | 0 | 1 | 0 |
| STATE I | X | 0 | 0 | 0 | 0 | 0 |
| STATE I | X | 0 | 1 | 0 | 1 | 0 |
| STATE I | X | 1 | 0 | 0 | 1 | 0 |
| ERROR | <32h | X | X | TECOUNT + 1 | X | X |
| ERROR | >32h | X | X | 0 | 0 | 0 |

The secondary function implies that a Peak event should always be preceded by a Trough event, and additionally, a Trough event should always transition into a Peak event within a limited number of samples.

After the state machine has transitioned to the next state, the rough timer is tested to see if it is a valid range. For the ideal case, the elapsed time from STATE D to STATE H should be one-half the fundamental frequency (where T=1/f) of the vehicle suspension.

The state machine has two main output flags. The first main output flag enables a rough road timer. This timer is used to measure the period of the acceleration signal. The fundamental frequency of the TDIFF signal must be near the passband frequency of the suspension (around 12 Hz in most automobiles) in order to meet one condition for enabling rough road compensation. The second output flag is the ENABLE OFFSET flag. The rough road compensation function should only calculate an offset when the state machine's current state is G, H or I.

A rough road offset is calculated:
IF:
the rough road timer is within a valid range
AND
the ENABLE OFFSET flag is set
AND
the PEAK flag is set
AND
the Startup Transient response is extinct. If all of these conditions are True, then the final step is to calculate as offset. The offset equation has the form:
TDIFF(n)*5/8=IRROS with a saturation value defined as Wn*(TRES(n−128)*1/9+OSLIMIT/2)

Where Wn represents a damping coefficient proportional to the stiffness of the vehicle suspension. For example, a pickup truck might use a damping coefficient of 1.5, but a luxury car may only need a damping coefficient of 0.5. A saturation limit sets a realistic upper bound on the magnitude of rough road disturbance to be compensated. In practical terms, an acceleration greater than 1.5 g should be considered extreme.

Step Offset

The step function is used to compensate for expected large variations in the TDIFF signal. Although there are two different types of step functions, both are classified under the same offset variable in the control program.

Figure 14:
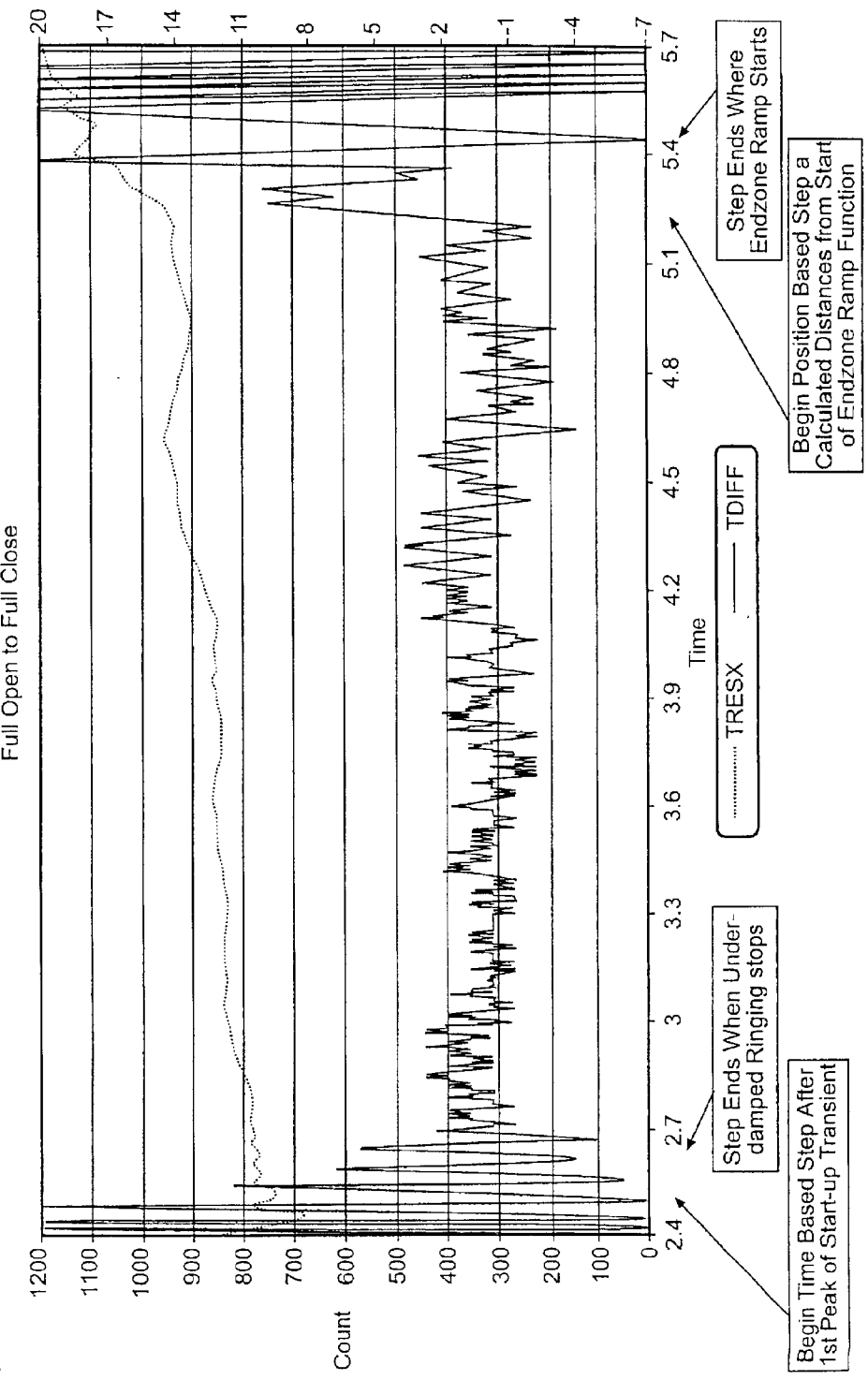
FIG. 14 is a graph depicting time based and position based step function compensation calculation.

The first step function is based on time and is shown on the left side of the graph depicted in FIG. 14. During system characterization, some systems demonstrate quite an under-damped response at startup. This phenomenon shows up as a decaying oscillation in the TDIFF signal. Mathematically, it would have the form of: $a_x Cos(bt)_x l-AT$. However, different systems have varying responses.

Some systems, such as that depicted on the left side of the graph in FIG. 14 show quite a bit if "ringing" at startup. The under-damped step is enabled as a function of time and the magnitude is set as a function of voltage. The control sequence executes the following steps:

1. The TDIFF data is reviewed and the value of the second positive peak is recorded. The time from start to the third, fourth, or fifth "hump", is recorded where it can be said that the transient response is extinct.
2. These values are built into a lookup table.

A function is generated based on the magnitude of the second positive peak as a function of voltage having the form:
$a_x IVOLTUS+b$. This is the equation used to calculate the value of the under-damped step response.

The duration of the transient can either be made a constant (only if necessary for size restrictions) or as an equation having the form $a_x IVOLTUS+b$, where "b" is the minimum decay time for the transient response, and, "a" is the modifying term of the voltage offset that equals the maximum decay time for the transient response. All times are measured in terms of MODECT, which has a resolution of 4 ms. By way of example:
IF
mindelay time=90 ms
THEN
MODECT value is 90/4=22.
IF
maxdecay time=120 ms
THEN
MODECT value is 120/4=30

The second type of step function accounts for seal irregularities at the end of travel. There are several panel systems, such as vehicle door system designs, where one edge of the glass makes contact with the seal while there is a significant (+6 mm) opening between another edge of the glass and the seal. The second position step function takes into account the disturbance in the TDIFF signal while allowing anti-pinch to remain active.

The second endzone step function is enabled as a function of position, as shown on the end of the graph of FIG. 14. If it is observed that the peak positive value for TDIFF noise increases notably near the upper end of panel travel, then a step function may be necessary. For example, if it seems that in the last 1/5th of travel, the TDIFF signal noise doubles in magnitude regardless of voltage, then the following procedure is instituted:

1. Record the position count where TDIFF is increasing,
2. Record the peak magnitude of TDIFF in this last region of travel,
3. Build a lookup table of these values over voltage and temperature and,
4. Create a function based on temperature and voltage that maps this increase in TDIFF.

This function becomes the equation to be implemented for the magnitude of ISTEPOS based on position.

Speed (RPM) Compensation

Speed compensation is designed to replace voltage compensation during steady-state operation of the motor 16. Since panel velocity is a direct measurement of the kinetic energy in a system, the speed of the motor 10 can be used to determine the expected variation in TDIFF. Speed compensation improves the robustness of the system by allowing for greater variation in the performance of the motor 10 relative to the applied voltage.

As some independent factors, such as in incorrectly coupled or mounted motor in a system or a harness resistance which may be significantly different from the value used for characterization, or the regulator having a wide tolerance for efficiency, may interfere with speed compensation. Monitoring the speed of rotation of the armature 28 instead of monitoring voltage can address all of these factors. The slower the speed of rotation of the armature 28, the lower the inertia of the system, and the greater the sensitivity of the TDIFF signal.

Figure 15A:
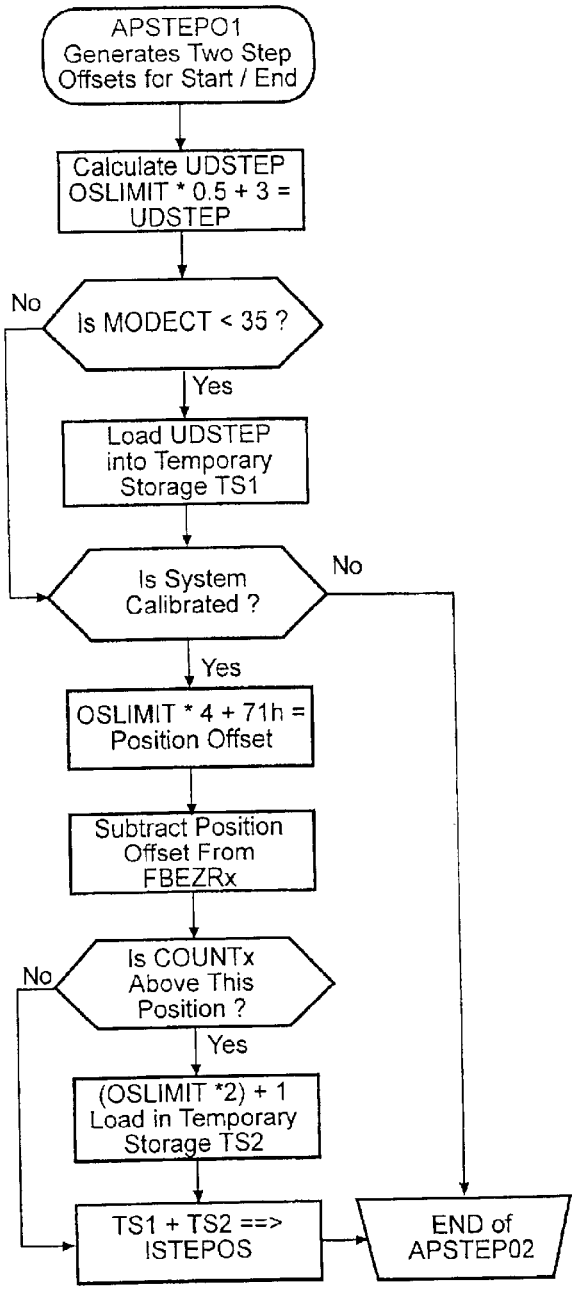
FIG. 15A is a flow diagram depicting the control sequence for calculation of the time based and position based step function compensation.
Figure 15B:
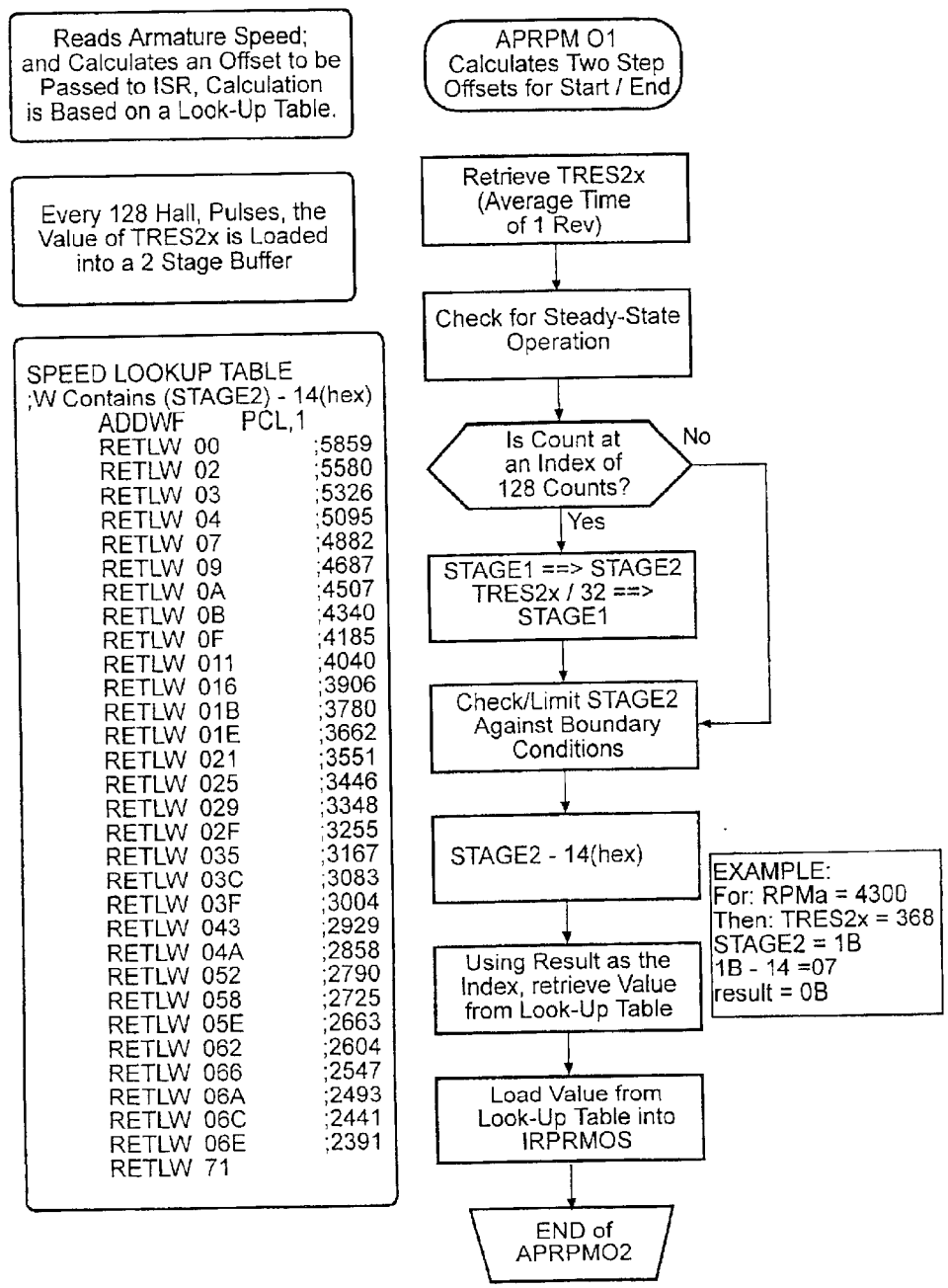
FIG. 15B is a flow diagram depicting the control sequence for speed based compensation.

The control sequence used to implement speed compensation is shown in FIG. 15. A value proportional to the speed of rotation of the armature 28 is used as an address to a speed lookup table which outputs a compensation value for the noise level 50.

Figure 16:
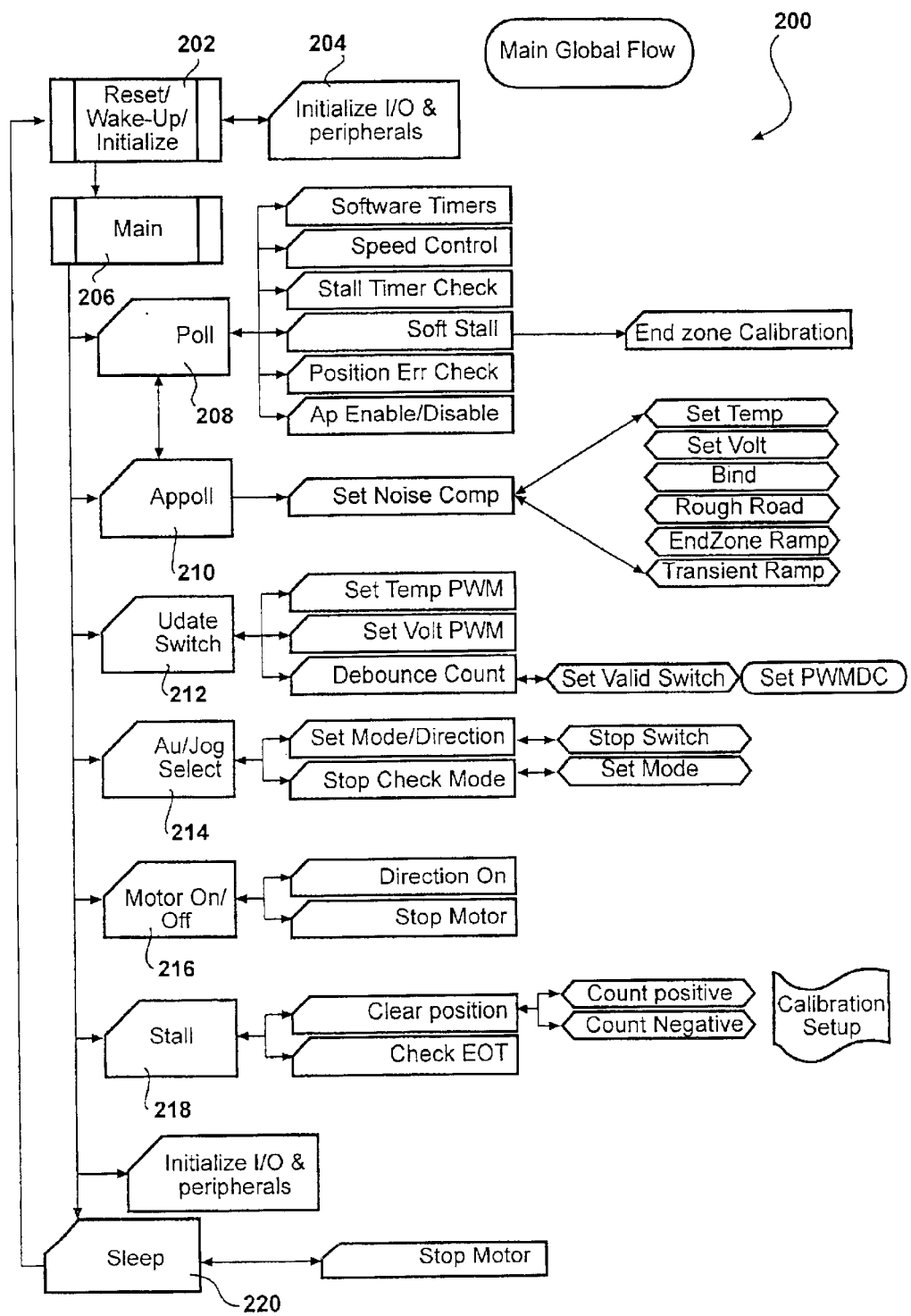
FIGS. 16 and 17 are block diagrams depicting the main sequence steps in the obstacle detection method according to the present invention.
Figure 17:
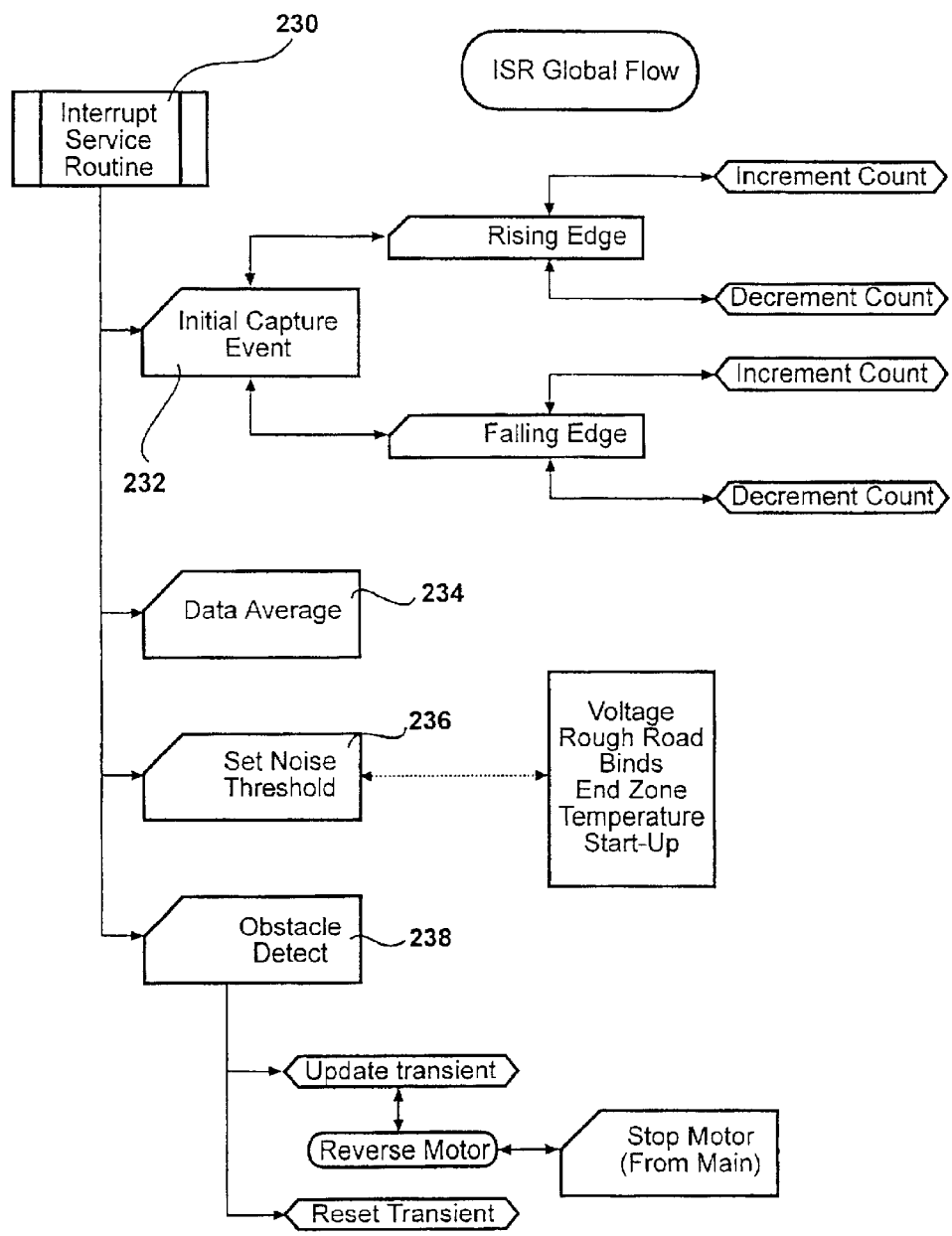
Figure 18A:
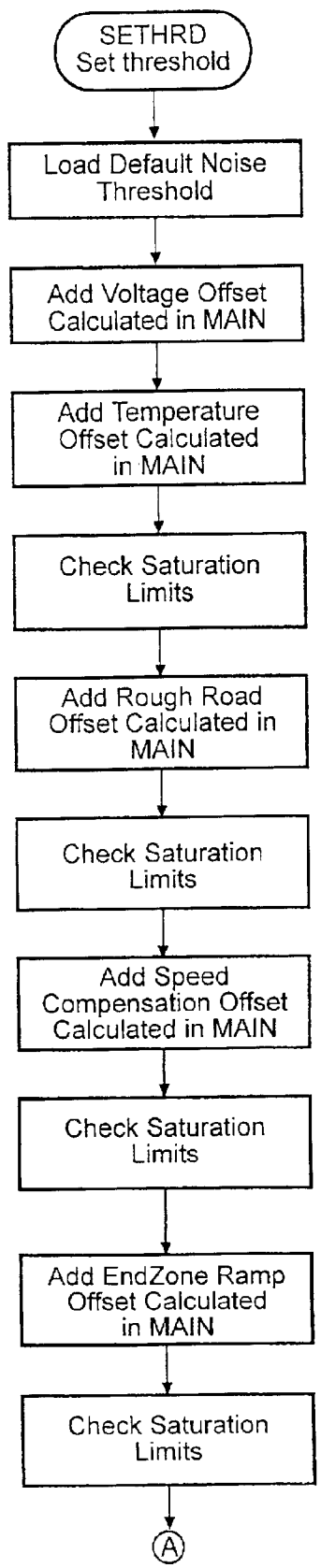
FIGS. 18A–18E are flow diagrams depicting the individual steps in the obstacle detection method of the present invention.
Figure 18B:
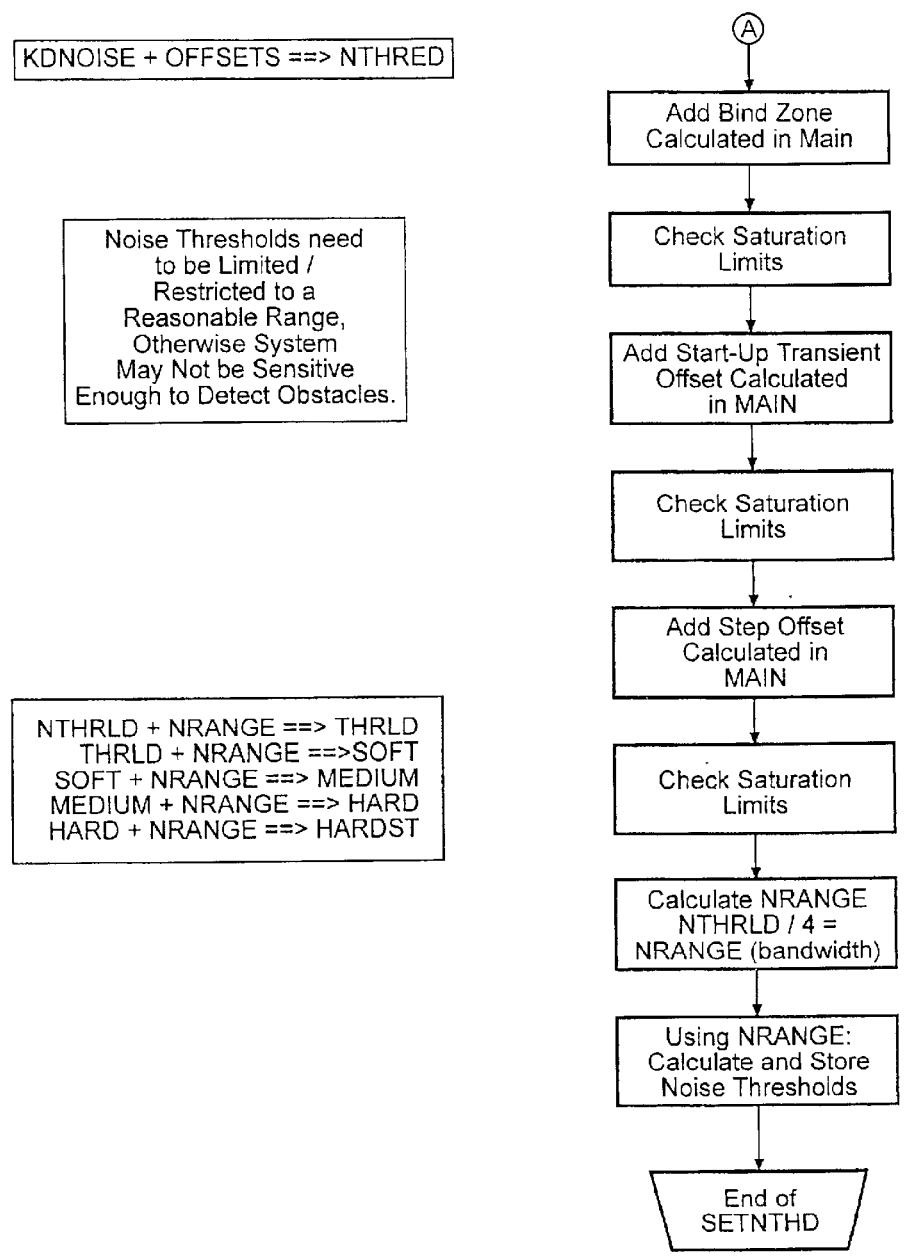
Figure 18C:
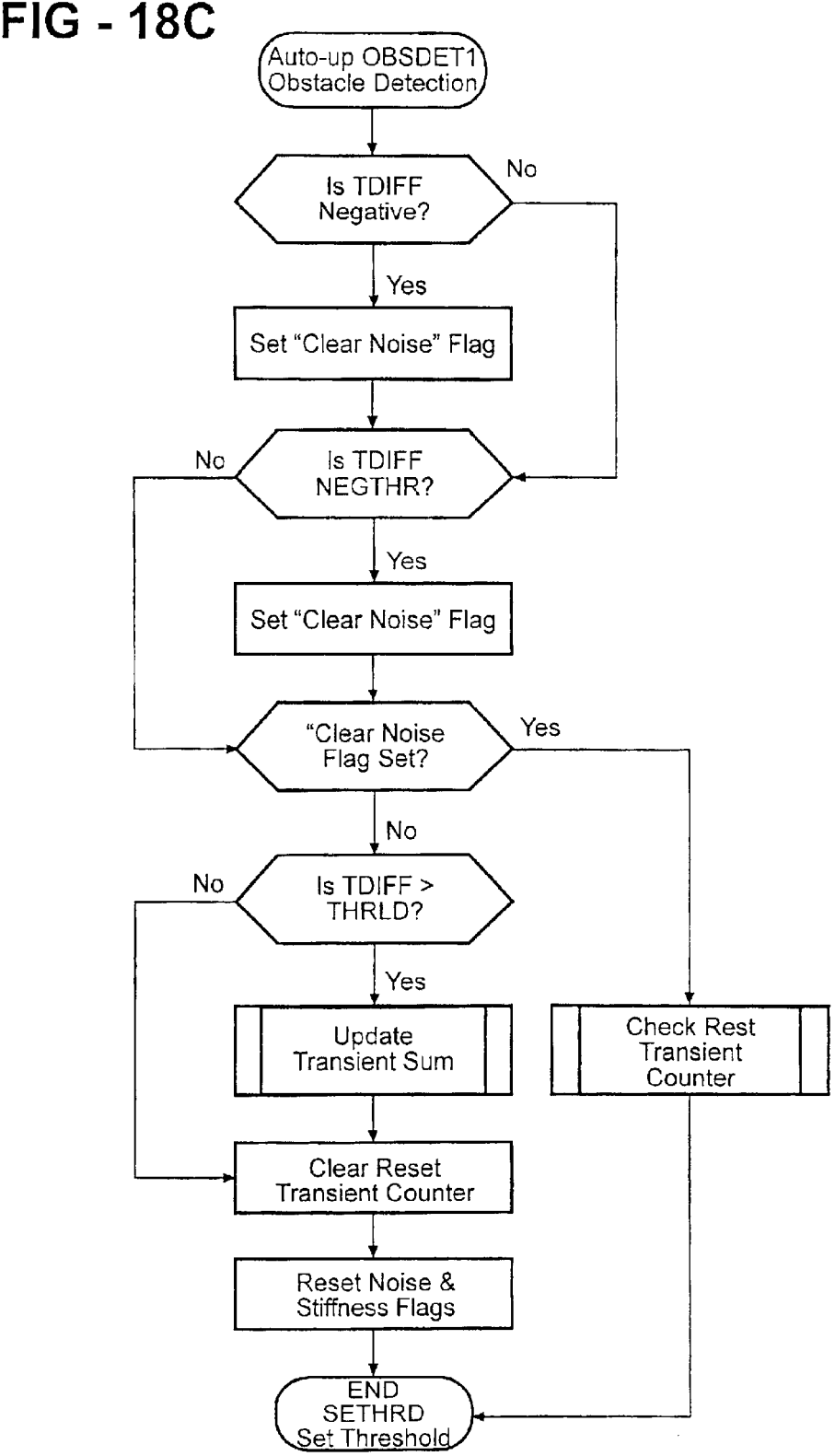
Figure 18D:
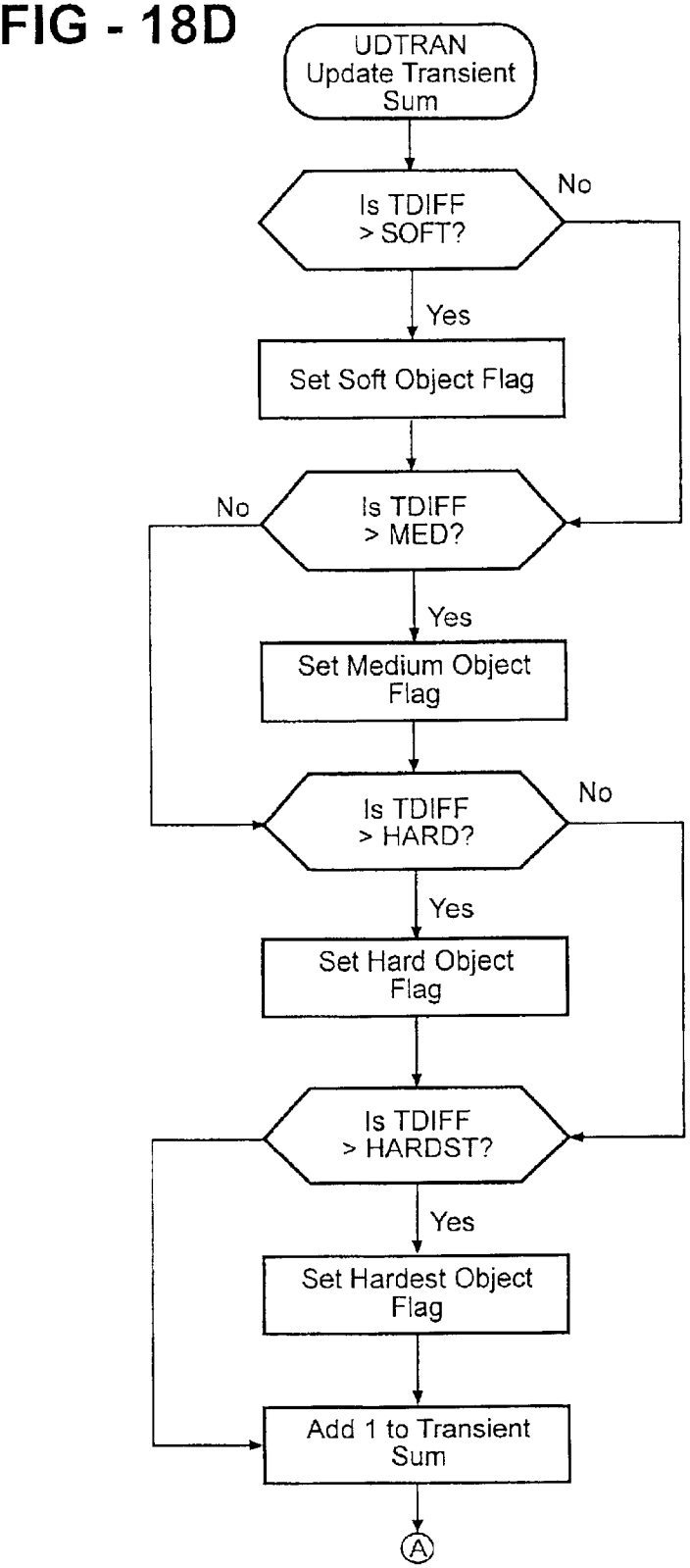
Figure 18E:
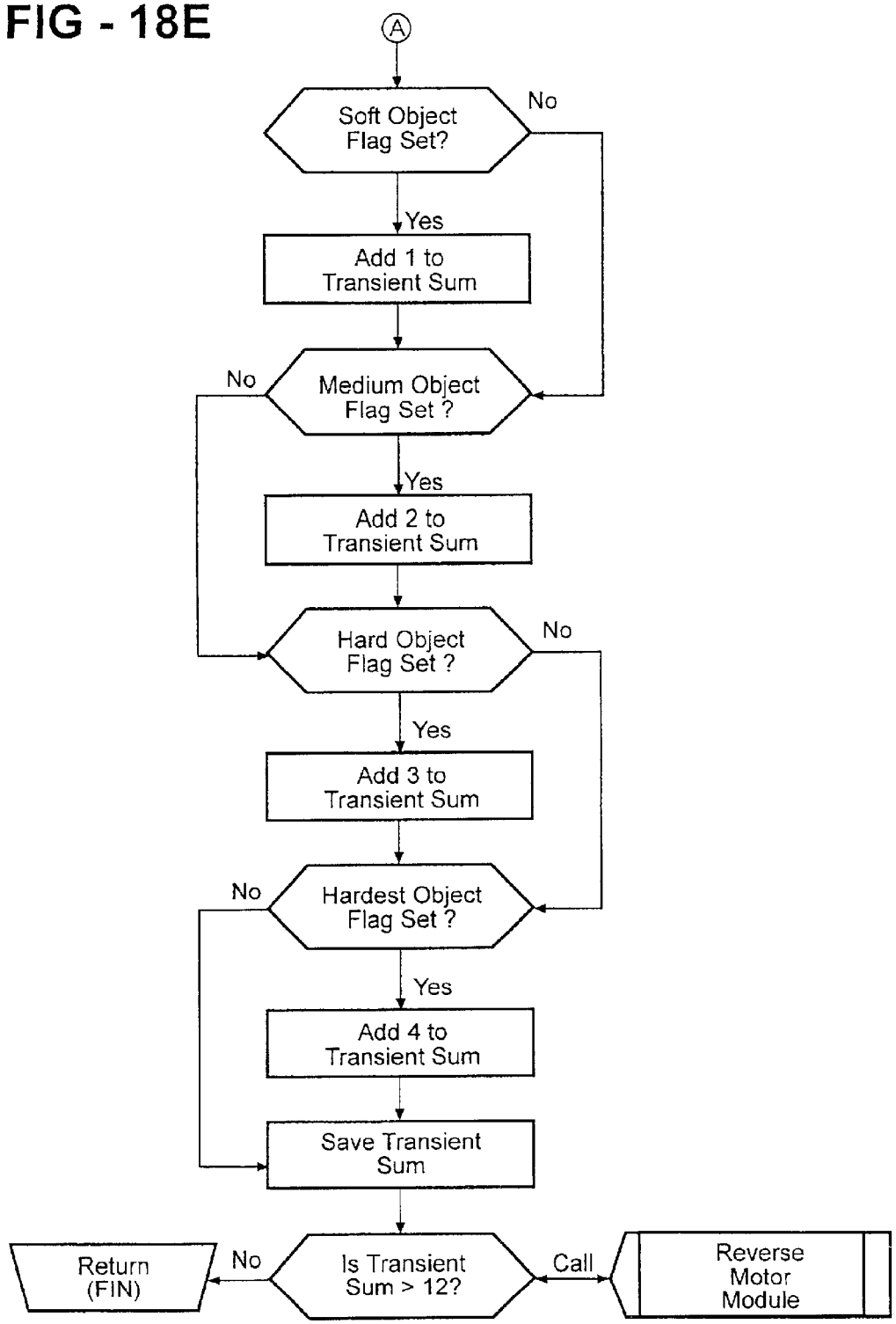

Referring now to the block diagrams in FIGS. 16 and 17, and to the flow charts in FIGS. 18A–18E, there is depicted the main functional steps in the control program and interrupt service routine employed by the control 20 of the present invention.

The main or top level control sequence 200 is shown in FIG. 16. Once reset and sequence to a wake-up program, the control checks various status flags in step 202 and then initializes inputs and outputs and peripherals in step 204. Step 204 generally includes checking status flags, initializing the random access memory, initializing ports by setting inputs and outputs and turning on the motor armature 28, the Hall sensor 30, initializing peripherals including timers and timer prescalers, initializing panel position, initializing interrupts, and enabling interrupts then entering the main routine in step 206. In the main routine, the control executes step 208 which causes a polling of various functions, including software timers, speed control, stall timer check, soft stall check, position error checking, anti-pinch enable and endzone calibration.

From the polling step 208, anti-pinch compensation routines are next polled in step 210. This step includes setting the various compensations, such as one or more of temperature, voltage, bind, rough road, endzone ramp and startup transient ramp.

Next, in step 212, the control 20 polls the various switch inputs, reads battery voltage, reads and calculates ambient temperature and registers valid switch state changes.

Next, in step 214, the control 20 executes a switch decode and mode select function by reading the debounce switch initializing mode timers, reading the mode timers and then setting the mode to one of auto-up, auto-down, manual-up, manual-down or halt. The control 20 then sets the motor 16 state flags.

During the main routine, step 216 is executed in response to switch changes or the detection of an obstacle. The control 20 reads the motor 16 state flags, turns the motor 16 on, loads the PWM duty cycle, initializes the stall timer, turns the motor 16 off when at the closed or second position or an object is detected and then resets and reinitializes the anti-pinch algorithm variables. The control 20 also executes step 218 to handle stall events when appropriate. In executing this function, the control 20 sets the motor 16 state flags for off, disables the stall timer, adjusts and updates the panel position zones, adjusts and updates panel position, records calibration event data and checks panel limits.

Finally, step 220 enters a sleep-low power standby mode. In executing step 220, the control 20 turns the motor 16 off, turns off the Hall sensor 30, disables the interrupts, polls the ignition line, polls the debounce ignition line, sets the power status bits and goes to a reset vector/wake-up from sleep standby mode.

FIG. 17, depicts an interrupt service routine 230. In step 232, the control 20 executes an initial capture event at the rising and falling edge of the output signal from the Hall sensor 30. The control 20 resets and reinitializes the edge detection interrupt flags, toggles the edge selection, polls the direction input line and updates position count information.

Next, in step 234, the control 20 reads and generates an average new timer sample. The control 20 executes this function by resetting the stall timer, storing a new timer sample, calculating a new average, storing the new average, calculating a new TDIFF and then storing the new TDIFF sample in memory.

Next, in step 236, the control 20 sets noise thresholds by loading a default noise threshold, adjusting the default with offsets passed from compensation routines in the main flow sequence, calculates the threshold bandwidth, calculates the stiffness thresholds and then checks the overall range of the compensated thresholds.

Finally, in step 238, the control 20 looks for an obstacle. In executing this function, the control 20 compares TDIFF to noise and stiffness thresholds, see FIGS. 18C–18E, updates the transient reset debounce counter, resets the transient count, updates the transient count, halts the motor 16 upon detection of an obstacle as described above, calculates the minimum reversal point and then sets flags to run the panel in an opposite direction to an open or down position.

Multi-Zone Compensation

The present invention also contemplates an obstacle detection system having a plurality of different zones of operation wherein a panel, such as a vehicle sun roof, sliding window, sliding door, etc., has two different modes of movement on operation between two positions can be divided into multiple zones due to different operating parameters or environmental conditions in each zone, such as when a sliding glass panel pivots due to a lever arm in the mechanism in one zone versus sliding in a channel in the mechanism in another zone.

Figure 19:
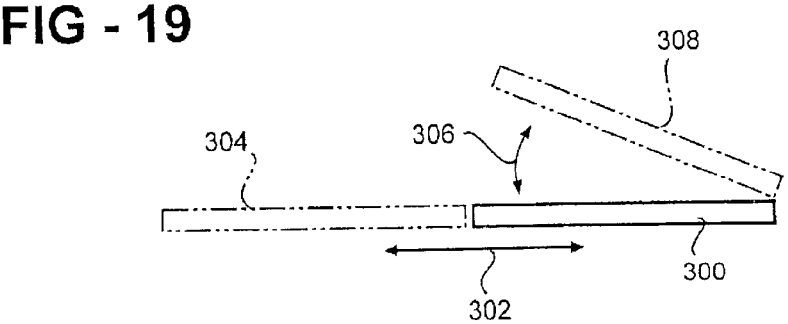
FIG. 19 is a pictorial representation of a multi-zone movable control panel controllable by the apparatus and method of the present invention.

In FIG. 19, a pivotal, sliding vehicle sunroof panel 300 is depicted. The panel 300 is typically mounted in a normal first position closing an opening in a vehicle roof, not shown. Also not shown, are the drive motor, actuator, and linkage which interact to slide the panel 300 from the first position in the direction of arrow 302 to a second position denoted by reference number 304 wherein the panel 300 at least partially opens the roof opening, and a second pivoted position shown in the direction of arrow 306 to a raised, pivoted position 308.

As the speed variations are different when the panel 300 moves in the direction of arrow 302 from the direction of movement 306, the present invention contemplates an obstacle detection, anti-pinch control which has different threshold levels for obstacle detection, one for each mode or zone depicted by movement arrows 302 and 306.

For example, the noise or offset 50 level magnitude in FIG. 3 can be varied for each of the modes or zones 302 and 306 to effect different detection levels which are used to determine the presence of an obstacle in the path of movement of the panel in the direction of arrows 302 or 306.

Similarly, the time based and/or position based step functions described above and shown in FIG. 14 also can be used to create a multi-zone approach to obstacle detection for a movable panel. The offset level 50 for the time based step function or the position based step function depicted in FIG. 14 can be different and merely selected from a lookup table depending upon the mode of operation of the system.

Further, any one or all of the compensation factors, such as rough road, voltage, temperature, etc., can have different look up table values or utilize different algorithm in each zone.

In summary, there has been disclosed a unique motor speed based anti-pinch control apparatus and method having a robust control which accommodates multiple modes of movement of the panel, includes compensations for various events, including buying condition, voltage, ambient temperature, rough road, end of zone ramp, startup transient, time or position based offset.

What is claimed is:

1. A powered movable panel control apparatus for a panel movable between first and second positions by an electric motor having an armature coupled to the panel, the armature including a magnet having a plurality of poles, the control apparatus comprising:

means for detecting deceleration of a motor armature;

timer means, responsive to the detecting means, for generating consecutive time periods between a predetermined amount of rotation of the armature over at least a portion of one complete revolution of the armature;

means, responsive to the timer means, for calculating an average time period over the predetermined number of time periods;

means, responsive to the average time period, for calculating the deceleration of the motor armature between two average time periods of the armature rotation;

means for comparing the deceleration with a threshold defining normal motor decelerations resulting from motor armature load variations;

means responsive to a comparison exceeding armature load threshold for classifying the deceleration as a relative deceleration with respect to the threshold;

means for assigning a weighted value based on the relative deceleration with respect to the threshold;

means for accumulating successive weighted values as a total cumulative weighted value;

means for comparing the total cumulative value to a defined obstacle detection weighted value;

means, responsive to the comparing means, for generating a signal to reverse the direction of movement of the panel when the total cumulative weighted value exceeds the defined obstacle detection weighted value;

means for determining when the change in the average time period begins to decrease in magnitude after reaching a peak magnitude; and means, responsive to an affirmative output from the determining means, for activating the deceleration comparing means.

2. The system of claim 1 wherein:
the average time period is calculated over the passage eight poles past the sensor.

3. The apparatus of claim 1 wherein:
the average time period is calculated for eight successive poles of a total of sixteen successive poles passing the sensor.

4. The apparatus of claim 1 wherein the means for determining when the average time period begins to decrease further comprising the steps of:

means for measuring the rate of change between successive average time periods;

means for storing the largest change in slope between successive average time periods;

means for determining if the difference between successive average time periods is greater than an upper threshold;

means for storing a compensation value increased by the smallest rate of change between successive average time periods;

means for adding a compensation value to the threshold;

means for detecting a decrease in the rate of change of the average time period; and means responsive to a peak magnitude of the average time period for decreasing the compensation value by the largest rate of change between successive average time periods until the compensation value is zero.

5. A method for controlling a powered panel movable between first and second positions comprising the steps of:

detecting deceleration of a motor armature driving the panel generating consecutive time periods for rotation of the armature through a constant angular distance during at least a portion of one complete revolution of the armature;

calculating an average time period over the predetermined number of time periods;

calculating the deceleration of the motor armature;

comparing the deceleration with a threshold defining an obstacle in the path of movement of the panel;

reversing the motor when the deceleration is greater than or equal to the threshold;

calculating the average time period over a predetermined constant number of successive time periods;

determining when the change in average time period begins to decrease in magnitude after reaching a peak magnitude; and in response to an affirmative output from the determining step, activating the deceleration comparing step.

6. The method of claim 5 further comprising the steps of:

measuring the rate of change between successive average time periods;

storing the largest rate of change between successive average time periods;

determining if the difference between successive average time periods is greater than an upper threshold;

storing a compensation value increased by the smallest rate of change between successive average time periods;

adding a compensation value to the threshold;

detecting a decrease in the rate of change of the average time period; and in responsive to the peak detection means for decreasing the compensation value by the largest rate of change between successive average time periods until the compensation value is zero.

* * * * *